US010754285B2

(12) United States Patent
Kondo et al.

(10) Patent No.: US 10,754,285 B2
(45) Date of Patent: Aug. 25, 2020

(54) ORIGINAL COVER CLOSER AND OFFICE EQUIPMENT USING THE SAME

(71) Applicant: KEM HONGKONG LIMITED, Kowloon (HK)

(72) Inventors: Tetsuo Kondo, Kanagawa (JP); Satoshi Ogawa, Kanagawa (JP)

(73) Assignee: KEM HONGKONG LIMITED, Kowloon (HK)

( * ) Notice: Subject to any disclaimer, the term of this patent is extended or adjusted under 35 U.S.C. 154(b) by 243 days.

(21) Appl. No.: 15/866,848

(22) Filed: Jan. 10, 2018

(65) Prior Publication Data
US 2018/0196385 A1 Jul. 12, 2018

(30) Foreign Application Priority Data
Jan. 10, 2017 (JP) .................................. 2017-002171

(51) Int. Cl.
*G03G 15/00* (2006.01)
*H04N 1/00* (2006.01)
(Continued)

(52) U.S. Cl.
CPC ......... *G03G 15/605* (2013.01); *E05F 1/1253* (2013.01); *E05F 3/20* (2013.01);
(Continued)

(58) Field of Classification Search
CPC ........ G03G 15/605; E05F 1/1253; E05F 3/20; H04N 1/00554; E05Y 2201/21;
(Continued)

(56) References Cited

U.S. PATENT DOCUMENTS 5,115,162 A * 5/1992 Leonard .................. B60T 7/042
303/DIG. 3
6,100,963 A * 8/2000 Hosaka ................ G03G 15/605
355/75
(Continued)

FOREIGN PATENT DOCUMENTS

JP 2000-180993 A 6/2000

*Primary Examiner* — David H Banh
(74) *Attorney, Agent, or Firm* — Notaro, Michalos & Zaccaria P.C.

(57) ABSTRACT

To provide the original cover closer which can control a rotation torque accompanied with an opening and closing operation of in a simple structure, as compared to the conventional original cover closer, solution is made in that the original cover closer comprises an attaching part attached to the main body side; a supporting part, wherein its side plates are rotatably attached to the both side plates of the attaching plate via a hinge shaft, as well as the original cover is attached to the supporting part; a pressure receiving part provided between the both side plates of the attaching part; a cam slider slidably provided inside the supporting part by making its cam portion abut against the pressure receiving part; an elastic module resiliently provided between the cam slider and a free end side of said supporting part, so as to bring the cam slider into press contact with the pressure receiving part and to rotatably urge the supporting part in an opening direction of an original cover; and a brake module provided between the supporting part and the cam slider, and that the brake module consists of a plurality of friction protruding ridge portions provided on an inner wall surface of the supporting part toward the cam slider, and at least a gently-sloping upward inclined portion gradually climbing from the cam slider side is provided on each of the friction protruding ridge portions.

13 Claims, 24 Drawing Sheets

(51) Int. Cl.
  *E05F 1/12*     (2006.01)
  *E05F 3/20*     (2006.01)

(52) U.S. Cl.
  CPC ...... *H04N 1/00554* (2013.01); *E05Y 2201/21* (2013.01); *E05Y 2201/254* (2013.01); *E05Y 2201/638* (2013.01); *E05Y 2900/608* (2013.01)

(58) Field of Classification Search
  CPC ......... E05Y 2201/254; E05Y 2201/638; E05Y 2900/608
  See application file for complete search history.

(56)            References Cited

U.S. PATENT DOCUMENTS

| | | | |
|---|---|---|---|
| 6,363,858 B1* | 4/2002 | Voirin ................... | A63G 21/22 |
| | | | 104/112 |
| 6,456,365 B1* | 9/2002 | Hosaka ................... | B41J 29/13 |
| | | | 347/101 |
| 6,593,999 B1* | 7/2003 | Hosaka ................ | G03G 15/605 |
| | | | 271/265.01 |
| 2006/0099007 A1* | 5/2006 | Uchida .................. | G03G 15/60 |
| | | | 399/107 |
| 2006/0158702 A1* | 7/2006 | Kondo ............... | H04N 1/00519 |
| | | | 358/498 |
| 2006/0180972 A1* | 8/2006 | Suzuki ................ | G03G 15/605 |
| | | | 271/3.14 |
| 2009/0034208 A1* | 2/2009 | Suzuki ................ | G03G 15/605 |
| | | | 361/725 |
| 2009/0321194 A1* | 12/2009 | Ziegler ............... | H02K 7/1025 |
| | | | 188/71.1 |
| 2014/0201946 A1* | 7/2014 | Yabukoshi ........... | E05F 1/1261 |
| | | | 16/304 |

* cited by examiner

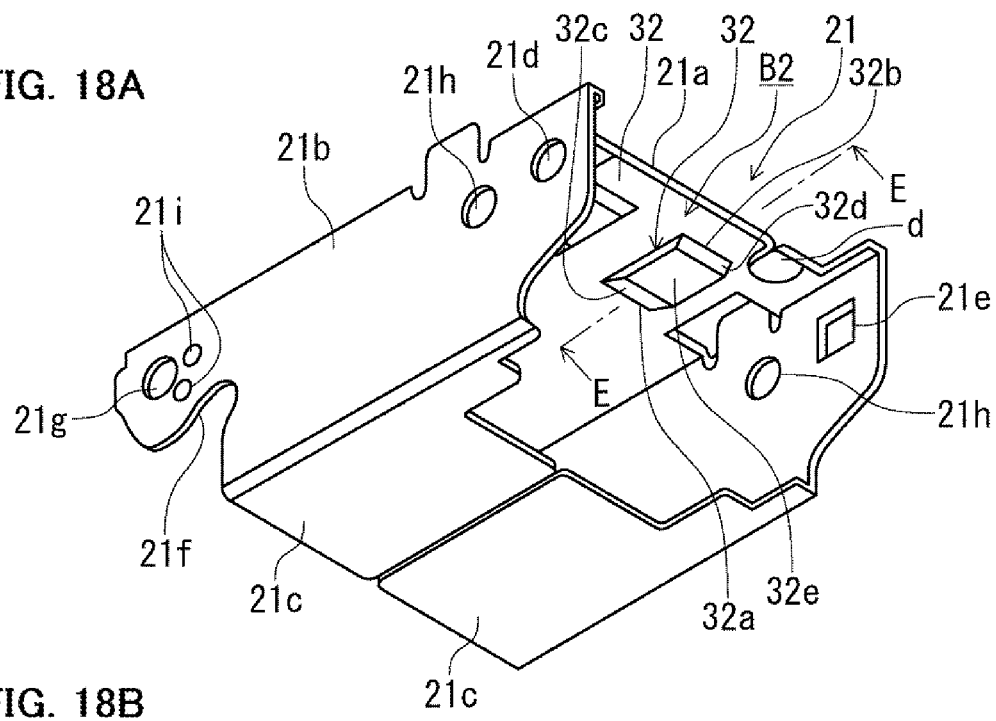
FIG. 18A
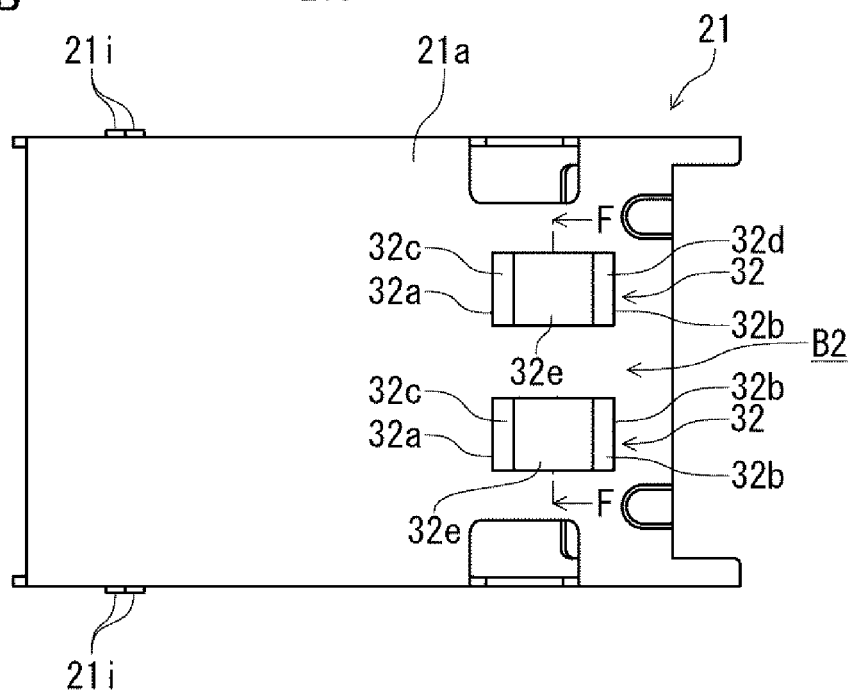
FIG. 18B
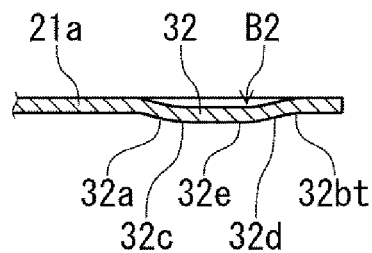
FIG. 18C
FIG. 18D

ORIGINAL COVER CLOSER AND OFFICE EQUIPMENT USING THE SAME

This application claims priority from Japanese Patent Application No. 2017-002171, filed on Jan. 10, 2018, the entire disclosure of which is incorporated herein by reference.

FIELD OF THE INVENTION

The invention relates to an original cover closer suitable in use when an original cover is openably and closably attached to a main body of office equipment such as (multifunction) printer, as well as to office equipment using such an original cover closer.

BACKGROUND ART

Conventionally, an original cover closer used for office equipment such as (multifunction) printer comprises an attaching member comprising an attaching plate attached to the main body side and both side plates erected from both sides of the attaching plate; a supporting member comprising a back plate and both side plates hanging down from both sides of the back plate, wherein the side plates are rotatably attached to the both side plates of the attaching plate via a hinge shaft; a lift member comprising a back plate and both side plates hanging down from both sides of the back plate, wherein the lift member is rotatably attached onto the free end side of the both side plates of the supporting member via a lift shaft; a pressure receiving member attached between the both side plates of the attaching member; a cam slider slidably provided inside the supporting member with its cam portion abutting against the pressure receiving member; a spring bearing member slidably provided on the free end side inside the supporting member; an actuating member abutting against the spring bearing member and attached between the both side plates of the lift member; an elastic means resiliently provided between the cam slider and the spring bearing member, so as to rotatably urge the lift member in a direction in which it overlaps the supporting member and to rotatably urge the supporting member in a closing direction of the original cover; a brake means consisting of a single friction protruding ridge portion provided between a central portion of an inner wall portion of the supporting member and the spring bearing member; such an original cover closer is known as shown in Laid-Open JP Patent Application No. 2000-180993.

However, in the original cover closer described in Laid-Open JP Patent Application No. 2000-180993, since a friction protruding ridge portion constituting the brake means is narrow, this is a single friction protruding ridge portion and it is provided on the central portion of an inner wall portion of a supporting member, there is a need to make the friction protruding ridge portion higher in order to assure a necessary friction torque. In this case, it is necessary to assure an adequate clearance, thus a so-called backlash occurs in an area in which a brake means does not function. It is therefore problematic that this backlash prevents a smooth operation of the original cover closer.

Moreover, in a conventional original cover closer, a friction generating means is provided, wherein friction plates or spring washers are provided one overlapping the other between a hinge shaft and both side plates of a supporting member, in order to obtain a friction torque, thus the number of parts is increased, which is obstacle for a reduction of costs.

Still further, to date, there is no original cover closer using conventional elastic means which ensures to control a rotation movement of a supporting member and to enhance operability of an original cover closer.

SUMMARY OF THE INVENTION

The invention is made to solve the above-mentioned problems. An object of the invention is to provide an original cover closer of a simple structure by elaborating its brake means which ensures a smooth and satisfactory slide movement, and assures a necessary friction torque, as well as office equipment using such original cover closer.

Next, a further object of the invention is to provide an original cover closer which ensures a control of an opening and closing operation of an original cover over an entire range of opening and closing angles of the original cover from its closed state to a fully opened state as well as from its fully opened state to a closed state, thus assuring a favorable operability, as well as office equipment using such original cover closer.

To achieve the above-mentioned object, an original cover closer according to a first aspect of the invention is characterized in that it comprises an attaching member comprising an attaching plate attached to the main body side and both side plates erected from both sides of the attaching plate;

a supporting member comprising at least a back plate and both side plates hanging down from both sides of the back plate, said side plates being rotatably attached to said both side plates of said attaching plate via a hinge shaft;

a lift member comprising at least a back plate and both side plates hanging down from both sides of the back plate, said side plates being rotatably attached to said both side plates of said supporting plate on their free end side thereof via a lift shaft, as well as said original cover plate being attached thereto;

a pressure receiving member provided between the both side plates of the attaching member;

a cam slider slidably provided inside said supporting member by making cam portion thereof abut against said pressure receiving member; a spring bearing member slidably provided on a free end side inside said supporting member;

an actuating member abutting against said spring bearing member and attached between said both side plates of the lift member;

an elastic means resiliently provided between said cam slider and said spring bearing member, so as to rotatably urge said lift member in a direction in which the latter overlaps said supporting member, and said supporting member in an opening direction of an original cover; and a first brake means provided between said supporting member and said cam slider;

said first brake means consisting of a pair of friction protruding ridge portions provided on an inner wall surface of said supporting member toward said cam slider in parallel with a predetermined interval, and at least a gently-sloping inclined portion gradually climbing from said cam slider side being provided on each of said friction protruding ridge portions.

To achieve the above-mentioned object, an original cover closer according to a second aspect of the invention is characterized in that it comprises an original cover closer comprising: an attaching member comprising an attaching plate attached to the main body side and both side plates erected from both sides of the attaching plate;

a supporting member comprising at least a back plate and both side plates hanging down from both sides of the back plate, said side plates being rotatably attached to said both side plates of said attaching plate via a hinge shaft;

a lift member comprising at least a back plate and both side plates hanging down from both sides of the back plate, said side plates being rotatably attached to said both side plates of said supporting plate on a free end side thereof via a lift shaft, as well as said original cover plate being attached thereto; a pressure receiving member provided between said both side plates of said attaching member;

a cam slider slidably provided inside said supporting member by making its cam portion thereof abut against said pressure receiving member;

a spring bearing member slidably provided on a free end side inside said supporting member;

an actuating member abutting against said spring bearing member and attached between said both side plates of said lift member;

an elastic means resiliently provided between said cam slider and said spring bearing member, so as to rotatably urge said lift member in a direction in which the latter overlaps said supporting member, and said supporting member in an opening direction of an original cover;

a damper means functioning from a predetermined closing angle of said original cover;

a first brake means functioning within a range of a predetermined intermediate opening and closing angle; and a second brake means functioning within a range of a predetermined intermediate opening and closing angle;

wherein said first brake means consisting of a pair of friction protruding ridge portions provided on an inner wall surface of said supporting member toward said cam slider in parallel with a predetermined interval, and at least a gently-sloping inclined portion gradually climbing from said cam slider side being provided on each of said friction protruding ridge portions; and wherein said second brake means comprises braking pieces provided on respective upper portions of both side plates of an attaching member, and projection portions provided on both side portions of a cam slider abutting against the braking pieces depending on an opening and closing angle of an original cover.

Still further, an original cover closer according to a third_aspect of the invention is characterized in that a hinge shaft is divided into two in the original cover closer according to a first to second aspect of the invention.

Still further, an original cover closer according to a fourth aspect of the invention is characterized in that a lift shaft is divided into two in the original cover closer according to a first to second aspect of the invention.

Still further, an original cover closer according to a fifth aspect of the invention is characterized in that the supporting member comprising embracing pieces covering said cam slider at least, and said cam slider comprising a protruding ridge portion on a side in contact with said embracing pieces in the original cover closer according to each of the above-mentioned aspects of the invention.

Still further, an original cover closer according to a sixth aspect of the invention is characterized in that a cylinder body or rotation member is provided on an outer circumference of the pressure receiving member.

Still further, an original cover closer according to a seventh aspect of the invention is characterized in that the pressure receiving member has a pin shape and is attached between the both side plates of the attaching member.

Still further, an original cover closer according to an eighth aspect of the invention is characterized in that the pressure receiving member is a bent member attached between the both side plates of the attaching member.

Still further, an original cover closer according to a ninth aspect of the invention is characterized in that the cam slider is structured so as to change its shape in a pressurized contact with said friction protruding ridge portions to mitigate an impact at the time of accommodation of the friction protruding ridge portions.

Still further, an original cover closer according to a tenth aspect of the invention is characterized in that the brake means is provided so as to function between the supporting member and the cam slider within a range of an intermediate opening and closing angle of 20 to 60 degrees of the original cover.

Still further, an original cover closer according to an eleventh aspect of the invention is characterized in that the brake means is provided inside each of the both side plates of the supporting member.

Still further, an original cover closer according to a twelfth aspect of the invention is characterized in that the damper means is provided between the cam slider and the spring bearing member.

Still further, an original cover closer according to a thirteenth aspect of the invention is characterized in that the friction stopper means for the supporting member functioning at a predetermined opening and closing angle of the original cover is provided between the cam slider and the attaching member.

Still further, according to a fourteenth aspect of the invention, it is characterized in that office equipment uses the original cover closer according to each of the above-mentioned aspects of the invention between a main body and an original cover.

The present invention is constructed as described above, therefore, an original cover closer using the elastic means in order to control an opening and closing operation of an original cover has effects, that it is of a simple structure and capable of controlling an opening and closing operation of a large-sized and heavy original cover, as well as of preventing a sudden flip-up during a closing operation, of stopping at free-stop at any intermediate opening and closing angle and maintaining the state, and of preventing the original cover from suddenly closing from a predetermined closing angle.

Still further, according to the invention, it is also possible to control a rotation torque of the supporting member in an entire range of an opening and closing angle of the original cover, as well as to further enhance the operability.

BRIEF DESCRIPTION OF THE DRAWINGS

FIGS. 18A to 18D show a supporting member of an original cover closer as shown in FIGS. 13 to 16, FIG. 18A being a perspective view as seen from below, FIG. 18B—its plan view, FIG. 18C—its cross sectional view in line E-E in FIG. 18A and FIG. 18D—its cross sectional view in line F-F in FIG. 6B;

EMBODIMENTS

Figure 1:
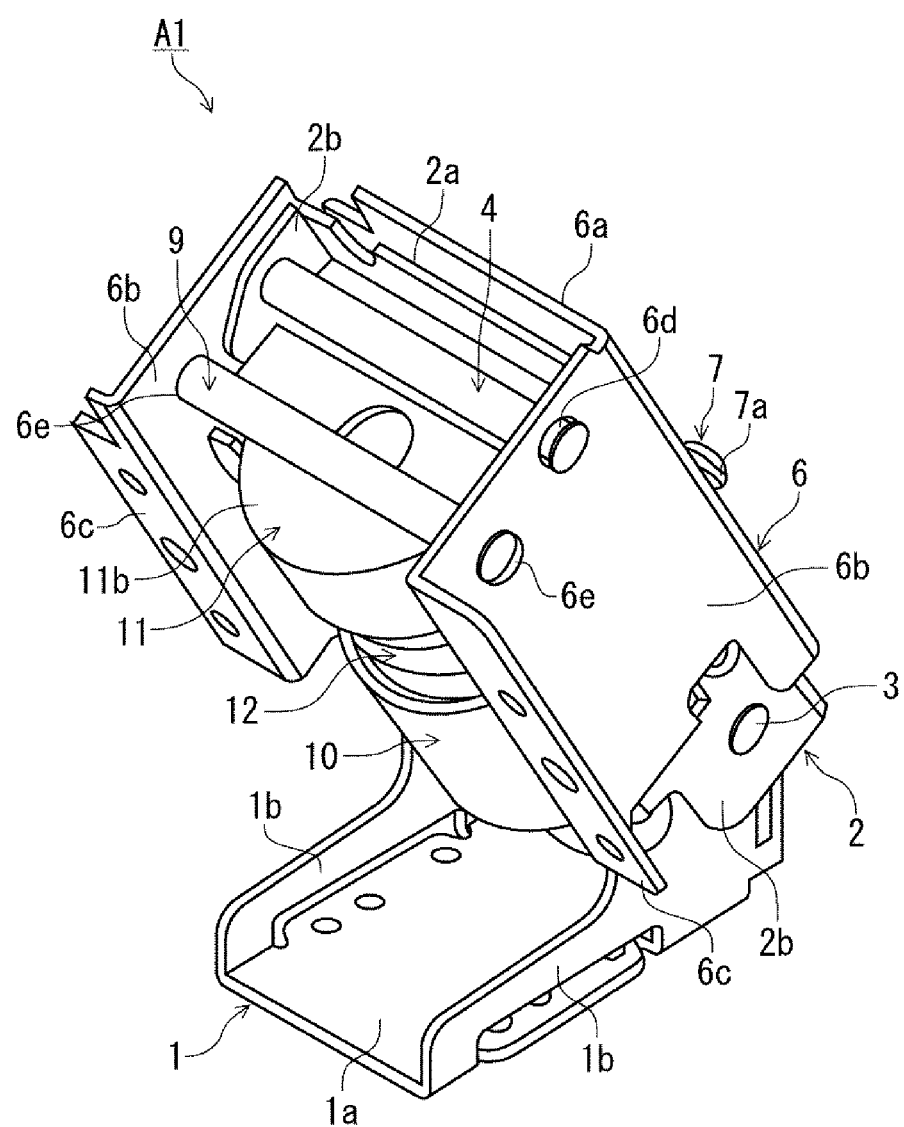
FIG. 1 shows a perspective view of appearance of Embodiment 1 of an original cover closer according to the invention.

In the following, an original cover closer according to the invention and office equipment using the original cover closer is described in detail based on the drawings. In the meantime, reference is made to the original cover closer as the one used for a multifunction printer among the office equipment, but the original cover closer according to the invention is also applicable to copy machine and printers other than multifunction printer, as well as to office equipment such as facsimile and scanner.

Embodiment 1

FIGS. 1 to 12 show in detail an original cover closer A1 according to Embodiment 1 of the invention. The original cover closer A1 according to the invention comprises: an attaching member 1 attached to a main body m1 (shown in FIGS. 2 and 9 to 12) of a multifunction printer M1; a supporting member 2, wherein its both side plates 2b are rotatably coupled via a hinge shaft 3 to both side plates 1b, 1b of the attaching member 1; a lift member 6 to which an original cover m2 (shown in FIGS. 2 and 9 to 13) is attached, wherein its both side plates 6b, 6b are rotatably attached via a lift shaft 4 to the both side plates 2b, 2b of the supporting member 2 on their free end side, such that the lift member is rotatable in a direction different from the rotation direction of the supporting member 2; a pressure receiving member 8 in the shape of pin provided between the both side plates 1b, 1b of the attaching member 1; a cam slider 10, wherein its cam portion 10 abuts against the pressure receiving member 8, the cam slider is embraced by embracing pieces 2c, 2c inwardly projecting perpendicular to the both side plates 2b, 2b of the supporting member 2 and provided so as to be slidable inside the supporting member 2; a actuating member 9 in the shape of pin provided between the both side plates 6b, 6b of the lift member 6; a spring bearing member 11 abutting against the actuating member 9 and thus housed inside the supporting member 2; and a twin coil spring-based elastic means 12 resiliently provided between the cam slider 10 and the spring bearing member 11, so as to rotatably urge the lift member 6 via the actuating member 9 in a direction in which the lift member overlaps the supporting member 2 and to rotatably urge the supporting member 2 in an opening direction of the original cover m2, wherein a small and a large coil springs 12a, 12b are provided so as to overlap each other in parallel. Moreover, a damper means 13 e.g. consisting of fluid damper is housed in a small-diameter coil spring 12b and inserted between the cam slider 10 and the spring bearing member 11; it is structured such that it starts functioning from a predetermined closing angle of an original cover m2 in order to prevent a sudden downfall of the original cover.

More specifically, particularly as shown in FIGS. 1, 5, 9 to 12, the attaching member 1 comprises an attaching plate 1a attached onto a main body m1, both side plates 1b, 1b provided on both sides of the attaching plate 1a upward and perpendicular (also substantially perpendicular) to the attaching plate 1a, and a substantially rectangular rear plate 1c provided on a rear end portion of the attaching plate 1a upward and perpendicular (also substantially perpendicular) to the attaching plate 1a and locking its both sides to the both side plates 1b, 1b of the attaching member 1.

Particularly as shown in FIG. 6, a supporting member 2 comprises a back plate 2a, both side plates 2b, 2b hanging down from both ends of the back plate 2a, narrow embracing pieces 2c, 2c respectively bent inward from respective lower ends of the both side plates 2b, 2b; as described above, the both side plates 2b, 2b are coupled to the outside of the both side plates 1b, 1b of the attaching member 1 by a hinge shaft 3 inserted through their respective circular attaching holes 2*d* and deformed attaching holes 2*e*. On a free end side of the both side plates 2*b*, 2*b*, a lift member 6 is rotatably attached via a lift shaft 4 inserted through coupling holes 2*f*, 2*f*, and guide groove portions 2*g*, 2*g* into which both side areas of an actuating member 9 are respectively fitted are provided.

In the meantime, those provided on the both side plates 2*b*, 2*b* of the supporting member 2 and denoted with reference numerals 2*i*, 2*i* are insertion holes; at the time of assembly, pins (not shown) are inserted into these insertion holes in order to stop a cam slider 10 and to couple the both side plates 1*b*, 1*b* of the attaching member 1 and the both side plates 2*b*, 2*b* of the supporting member 2 via a hinge shaft 3. Furthermore, reference numerals 2*j*, 2*j* denote ribs (only one of the two is shown).

Figure 4:
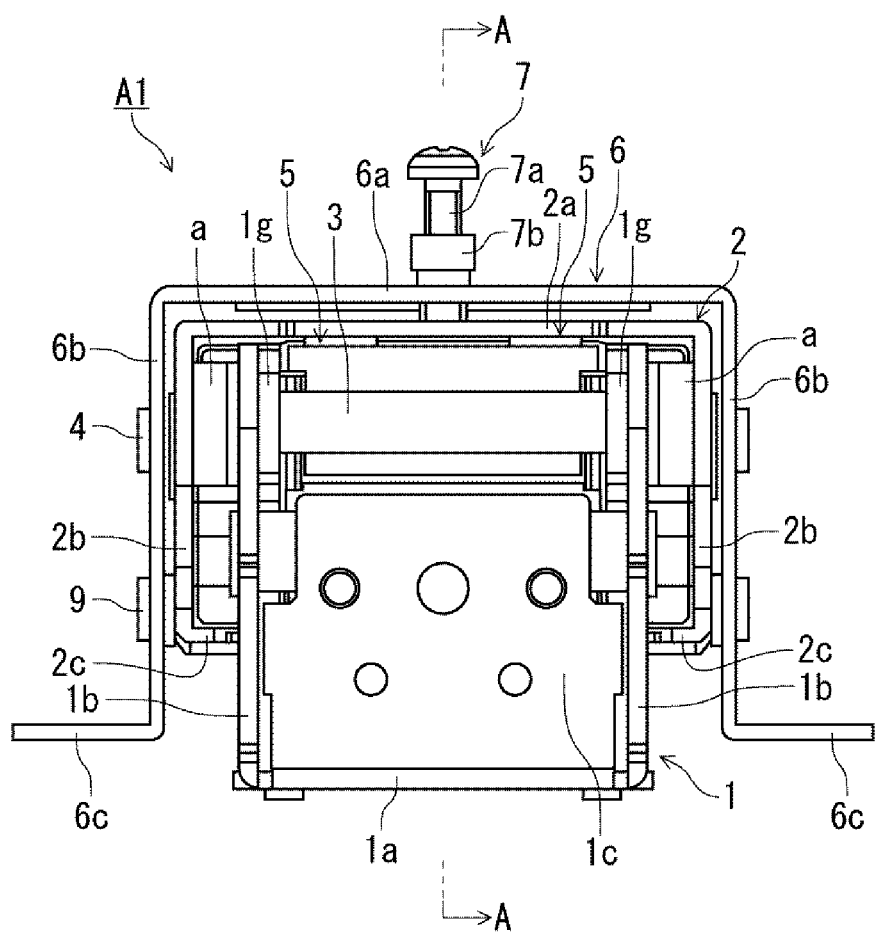
FIG. 4 shows an original cover closer as shown in FIG. 2, which is seen from the right hand side being a back surface.
Figure 5:
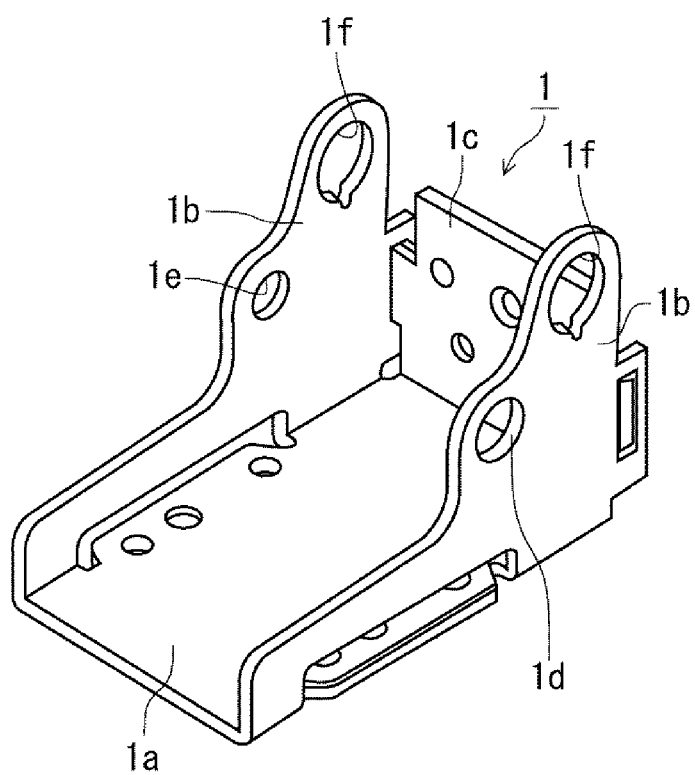
FIG. 5 shows a perspective view of an attaching member of an original cover closer as shown in FIG. 1.

A hinge shaft 3 which is made of metal and a round bar in the shape of pin comprises a deformed shaft portion (not shown); it is inserted through shaft bearing members 1*g*, 1*g* attached to shaft bearing member attaching holes 1*f*, 1*f* of the attaching member 1, then it is attached to the attaching member and the supporting member, such that the supporting member 2 is rotatable relative to the attaching member 1. Especially as shown in FIG. 4, ring-shaped spacers a, a are provided between the outside of both side plates 1*b*, 1*b* of the attaching member 1 and both side plates 2*b*, 2*b* of the supporting member 2, and a hinge shaft 3 is also inserted through the spacers. In this sense, while in the conventional original cover closer, a flange portion is provided on one end portion of a hinge shaft, and spring washers or friction washers are interposed between a side plate of an attaching member and a supporting member on the side with the flange portion, and then the other end portion of the hinge shaft is caulked so as to generate a friction torque, according to the invention, a brake means B1 for generating a friction torque is separately provided, so that a flange portion of a hinge shaft, and spring washers or friction washers can be omitted, so as to reduce manufacturing costs.

In the meantime, of course in Embodiment 1, but also in Embodiments 2 and 3, it is possible that the hinge shaft 3 is divided into two and structured so as to couple respective both side plates of the attaching member and the supporting member. The hinge shaft according to the invention includes the one divided into two.

A lift member 6 comprises a back plate 6*a* and both side plates 6*b*, 6*b* hanging down from both ends of the back plate 6*a*, perpendicular (also substantially perpendicular) to the back plate 6*a*. A lift shaft 4 inserted through coupling holes 2*f*, 2*f* of a free end side of a supporting member 2 is inserted through attaching holes 6*d*, 6*d* (only one is shown) provided on the both side plates 6*b*, 6*b* of the lift member 6; in this manner, the latter is coupled to the outside of the supporting member 2, so as to be rotatable in a direction contrary to the rotation direction of the supporting member 2. Moreover, attaching holes 6*e*, 6*e* (only one is shown) having a common shaft center are provided on the side of the lift member 6 coupled via a lift shaft 4, and an actuating member 9 made of metal in the shape of pin is attached to the attaching holes 6*e*, 6*e* (only one is shown).

Figure 24:
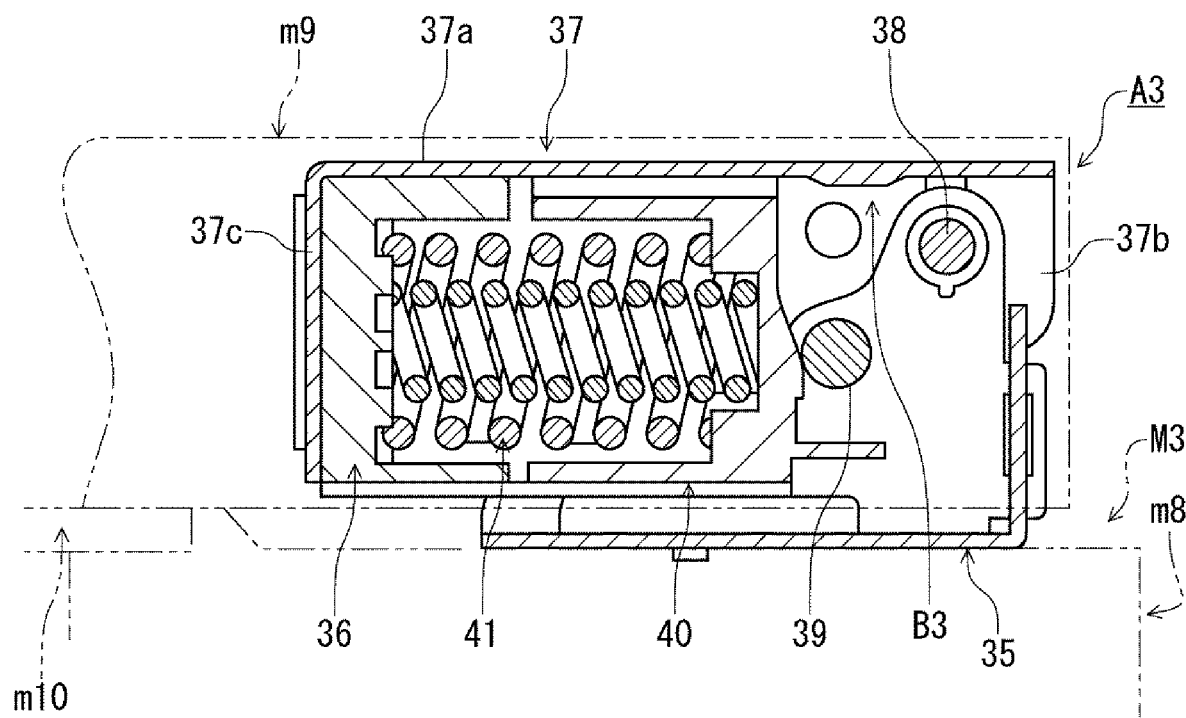
FIG. 24 shows a longitudinal perspective view of appearance of Embodiment 3 of an original cover closer according to the invention.

In the meantime, an actuating member 9 can be integrally or separately provided from a top plate (not shown) provided on a tip side of a lift member 6. Still further, as shown in FIG. 24 of Embodiment 3 to be described below, the invention is also applicable to an original cover closer A3 with no lift member. Claim 1 of the invention relates to this case.

An original cover m2 is attached to a back plate 6*a* of a lift member 6, and a height adjusting means 7 screwed with the back plate 6*a* and consisting of an adjusting screw 7*a* and a nut 7*b* screwed with the adjusting screw 7*a* is provided on the back plate 6*a* on its rear end portion side. The height adjusting means 7 is intended to finely adjust the height of the original cover m2 based on a platen glass m3 (contact glass) in order to realize a uniform press contact of the original cover m2 with the platen glass m3. A scale 2*h* used to this end is engraved on both side plates 2*b*, 2*b* of a supporting member 2. Although not shown, small diameter portions are provided on both side end portions of a lift shaft 4 and an actuating member 9. The ones on a supporting member 2 of attaching holes 2*f*, 2*f* (only one is shown) provided on the supporting member 2 and attaching holes 6*d*, 6*d* (only one is shown) provided on a lift member 6 have the shape of round cylinder with a diameter adjusted to an outer diameter of a large diameter portion of a lift shaft 4, while the attaching holes 6*d*, 6*d* on the lift member 6 have a keyhole shape consisting of a large and small circular holes with two centers, the latter hole on the top of the other; and the small circular hole is engaged with a small diameter portion of the lift shaft 4, which is then caulked. The attaching holes 6*e*, 6*e* on the lift member 6 into which the actuating member 9 is inserted as well have a keyhole shape consisting of a large and small circular holes with two centers, the latter hole on the top of the other; and the small circular hole is engaged with a small diameter portion of the actuating member 9, which is then caulked. In both cases, E-ring and so on are omitted in order to facilitate an attachment of the lift shaft 4 and the actuating member 9 and to reduce the costs. In the meantime, in the attaching holes 6*d*, 6*d* to which the lift shaft 4 is attached and the attaching holes 6*e*, 6*e* to which the actuating member 9 is attached, respective small circular holes lies in opposite directions, and the small circular holes of the attaching holes 6*d*, 6*d* face slightly downward. This is because due to a resilient force of an elastic means 12 working on the actuating member 9, a pressurizing force is applied on the side with the small circular hole.

In the meantime, it is possible that a lift shaft 4 is divided into two and structured so as to couple respective both side plates 2*b*, 2*b* of a supporting member 2 and the lift member 6. This also applies to Embodiment 2 to be described below.

A cam slider 10 embraced by embracing pieces 2*c*, 2*c* is slidably housed into the supporting member 2, and a spring bearing member 11 is also housed therein. The cam slider 10 and the spring bearing member 11 are both formed in the shape of bottomed cylindrical body. A spring bearing hole portion 10*a* is provided on one end portion of the cam slider 10 toward the spring bearing member 11, and a cover portion 10*b* covering a pressure receiving member 8 on its side exposed to the outside, and a cam portion 10*f* consisting of an upward inclined portion 10*c* and a downward inclined portion 10*d* provided next to the upward inclined portion 10*c* are provided toward the pressure receiving member 8. A spring bearing hole portion 11*a* is provided on the spring bearing member 11 toward the cam slider 10. The cam slider 10 and the spring bearing member 11 are housed in the supporting member 2, such that their respective spring bearing hole portions 10*a*, 11*a* face each other, and the cam portion 10*f* of the cam slider 10 abuts against the pressure receiving member 8, while an abutting portion 11*b* of the spring bearing member 11 abuts against the actuating member 9.

In the meantime, an actuating member 9 is made of metal in the shape of pin in this Embodiment, but it is also possible that a top plate (not shown) is provided on a lift member 6 and bent inwardly, or that an actuating member is provided on the top plate. Still further, the actuating member 9 can be rotatably or fixedly attached between both side plates 6b, 6b of the lift member 6. Still further, a cylinder body made of resin or other materials can be rotatably or fixedly attached to an outer circumference of the actuating member 9. An actuating member according to the invention includes these embodiments. This also applies to the invention according to Embodiment 2.

Figure 6A:
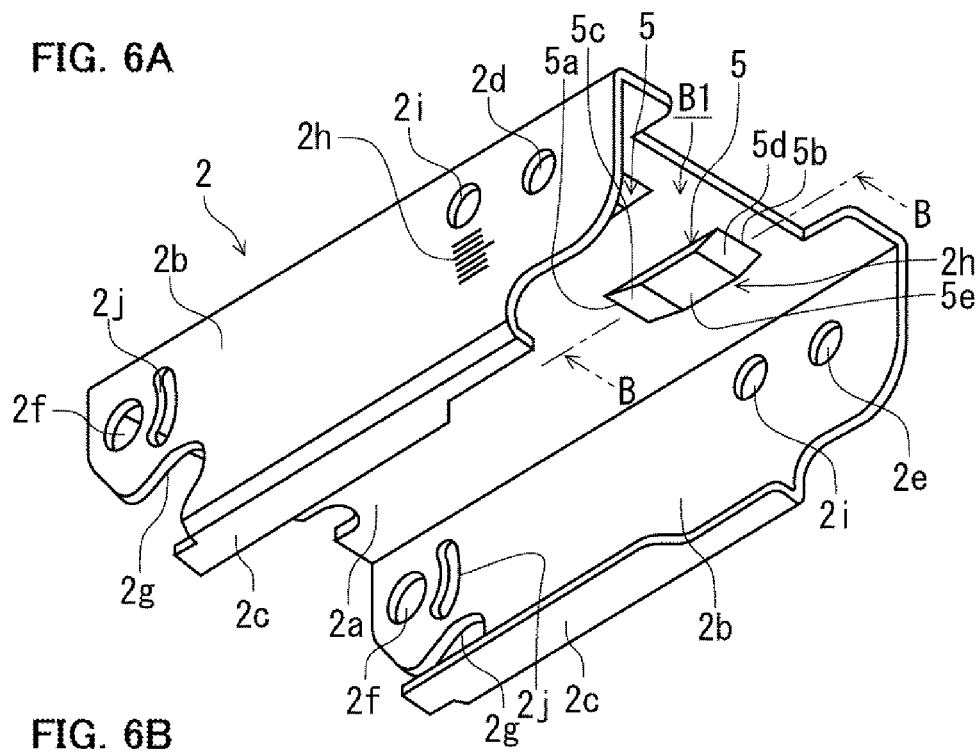
FIGS. 6A to 6D show a supporting member of an original cover closer as shown in FIG. 1, FIG. 6A being a perspective view as seen from below, FIG. 6B—its plan view, FIG. 6C—a view of friction protruding ridge portions in line B-B in FIG. 6A and FIG. 6D—its cross sectional view in line D-D in FIG. 6B.
Figure 6B:
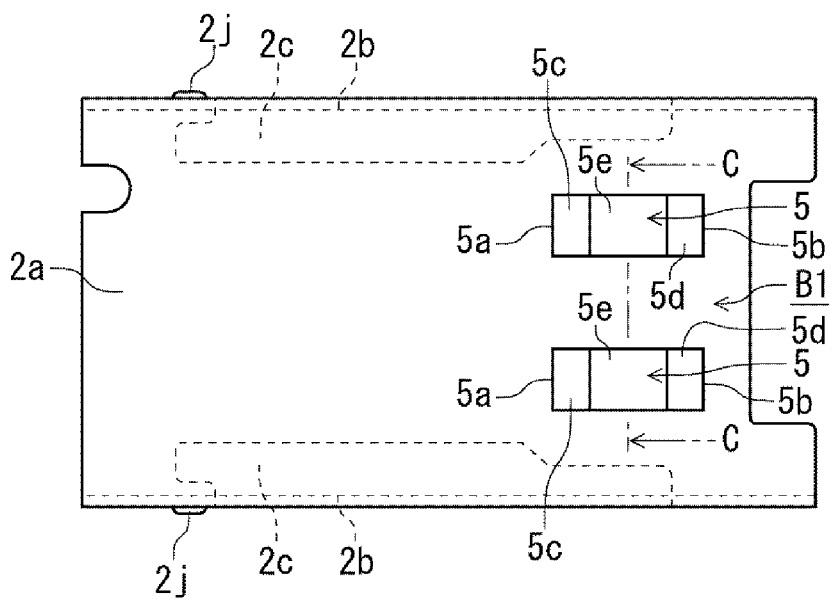
Figure 6C:
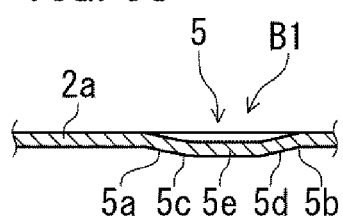
Figure 6D:
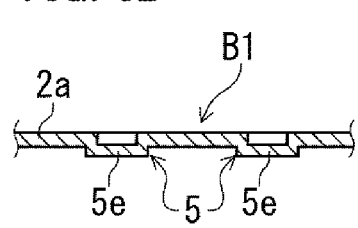
Figure 7A:
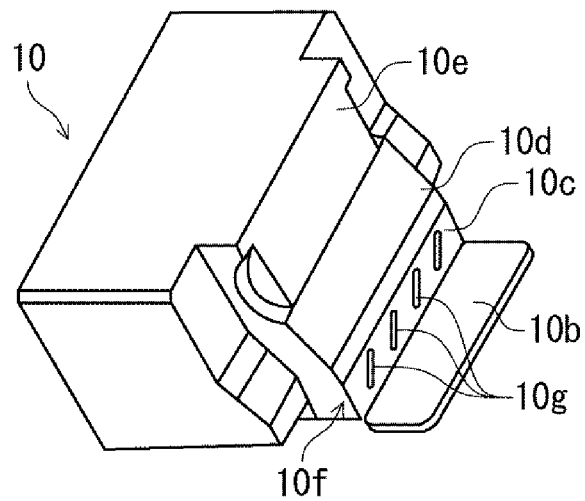
FIGS. 7A to 7C show a cam slider of an original cover closer as shown in FIG. 1, FIG. 7A being its perspective view as seen from the top, FIG. 7B—its perspective view as seen from below, FIG. 7C—its elevation view.
Figure 7B:
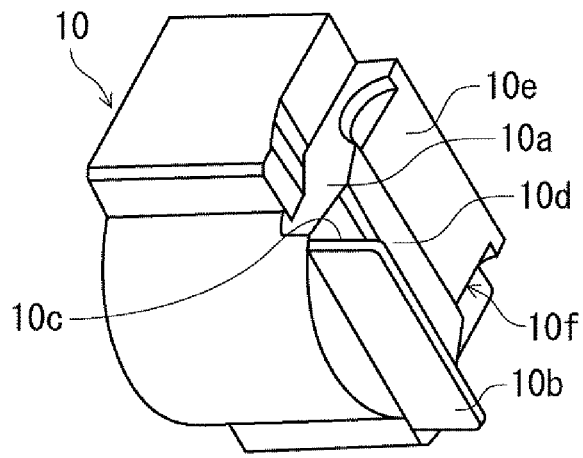
Figure 7C:
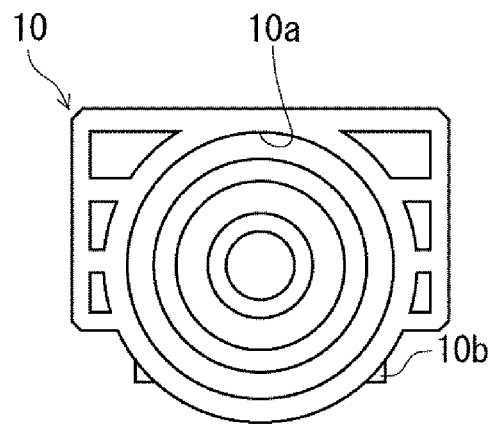
Figure 8A:
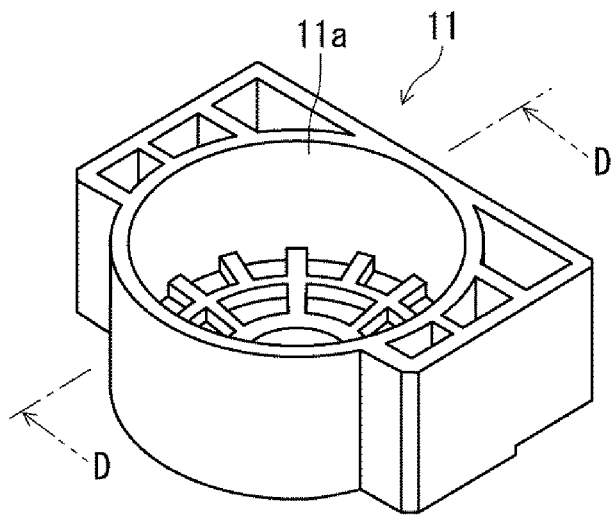
FIGS. 8A and 8B show a spring bearing member of an original cover closer as shown in FIG. 1, FIG. 8A being its perspective view as seen from backward, and FIG. 8B—its cross sectional view in line D-D in FIG. 8A.
Figure 8B:
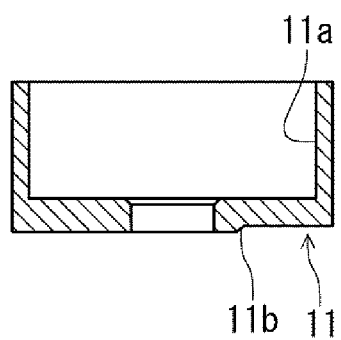

Next, a first brake means B1 is composed of a pair of friction protruding ridge portions 5, 5 provided substantially in parallel with a predetermined interval on a rear portion side of a back plate 2a of a supporting member 2, and intended to be in press contact with a back portion of a cam slider 10 within a predetermined range of opening and closing angles of an original cover m2, in order to exhibit a brake action to the supporting member 2 rotating about a hinge shaft 3 as a fulcrum. Especially as shown in FIG. 6C, each of the friction protruding ridge portions 5, 5 is formed to have inclined portions 5c, 5c; 5d, 5d gently climbing toward its central portion, which are respectively provided on its starting end portion 5a, 5a and terminal portion 5b, 5b, while its central portion is a flat portion 5e, 5e. The height of each of the friction protruding ridge portions 5, 5 is approximately 0.35 mm in the area of the flat portion. As per the shape of each of the starting end portions 5a, 5a and each of the terminal portions 5b, 5b, these portions are in parallel to the edge on the rear end portion side, i.e. perpendicular to both side plates 2b, 2b of a supporting member 2. The starting end portions 5a, 5a and the terminal portions 5b, 5b are respectively formed to have a semicircular or cuspidal shape. As other embodiments, it is not necessarily excluded to use only one but wider friction protruding ridge portion or more than two friction protruding ridge portions, but the friction protruding ridge portions according to the present embodiment is the most suitable.

In this embodiment, a cam slider 10 in particular is formed to be approximately 0.1 mm smaller than the dimension between an inner wall side of a back plate 2a and embracing pieces 2c, 2c of a supporting member 2 and that inside the both side plates 2b, 2b of the supporting member 2. This arrangement is so made to take into consideration the thickness of the friction protruding ridge portions 5, 5 of the first brake means B1.

Furthermore, friction protruding ridge portions 5, 5 of a first brake means B1 can be also provided on the side of both side plates 2b, 2b of a supporting member 2. Still further, since a cam slider 10 is made of synthetic resin, it is also structured to generate the whole or a part of friction torque by its deformation.

In the meantime, a pressure receiving member 8 is made of metal and in the shape of pin in this Embodiment, and its one end portion is formed as a small diameter portion, and a large and a small attaching holes 1d, 1e provided on both side plates 1b, 1b of an attaching member 1 are also accordingly formed such that one is small and another is large. A large diameter portion of the pressure receiving member 8 is inserted into a large diameter attaching hole 1d, and its small diameter portion is inserted into a small diameter attaching hole 1e, and then respective end portions are caulked so that the pressure receiving member is fixed; however, it is also possible to restrict the escape using E-ring. Furthermore, it can be also rotatably attached to the both side plates 1b, 1b. Still further, the pressure receiving member 8 can have other shape than the shape of pin: it is also possible to fix a bent member made of plate metal or synthetic resin and formed to have a protruding cross section to the inside of the both side plates 1b, 1b of an attaching member 1. Still further, it is also an option to fix or rotatably attach a cylindrical body made of synthetic resin or other material to the pressure receiving member 8. A pressure receiving member 8 encompasses these variants, and this also applies to the invention according to Embodiment 2.

Figure 2:
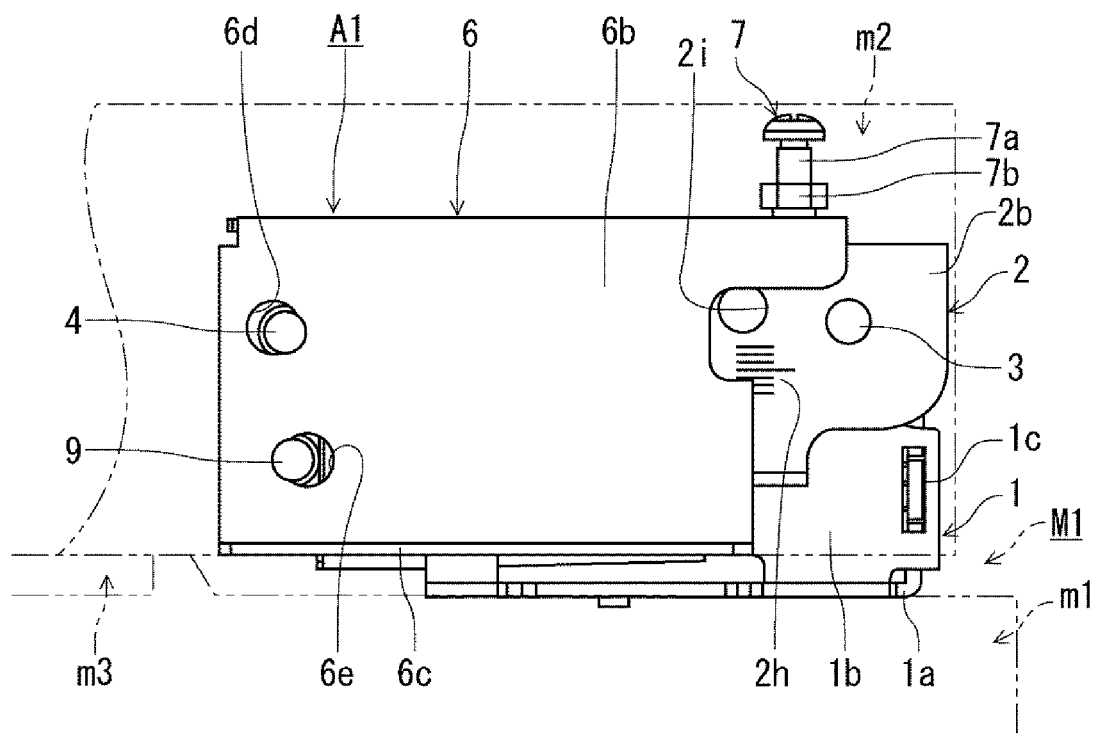
FIG. 2 shows a side view of an original cover closer as shown in FIG. 1 which is attached to a multifunction printer shown in imaginary lines, with an original cover shown in imaginary lines as well being closed.
Figure 3:
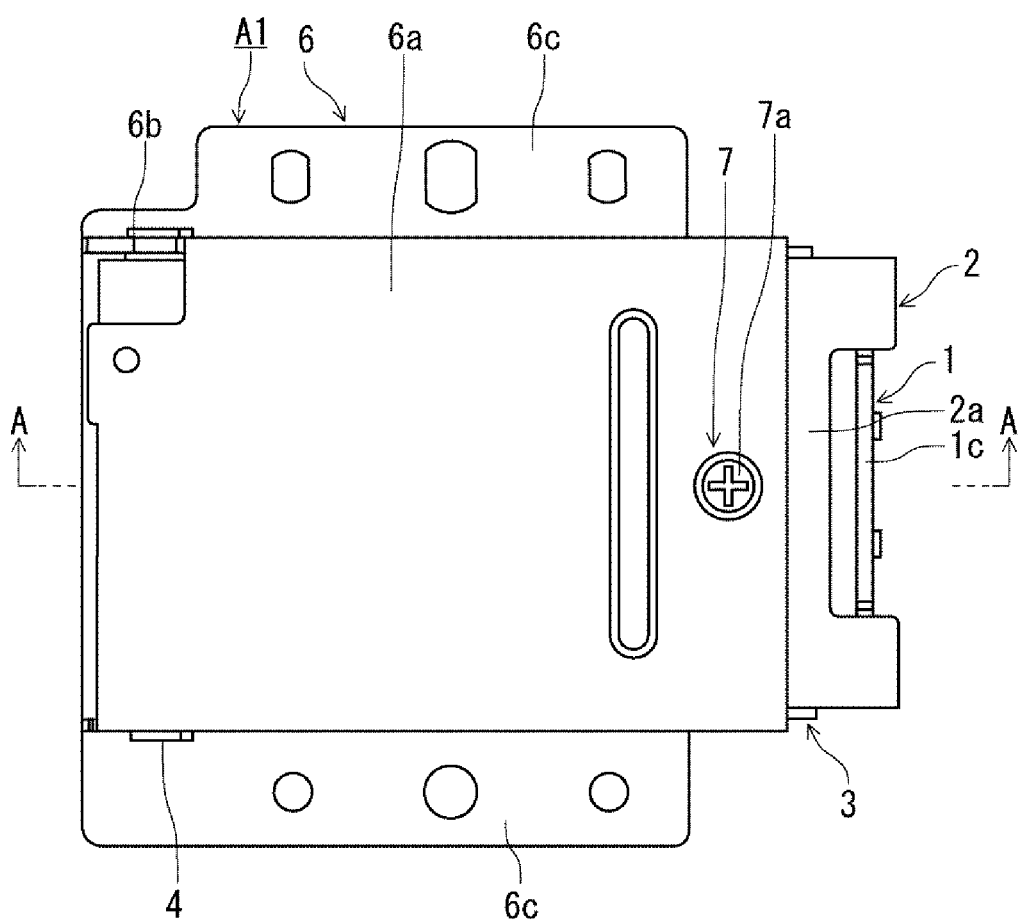
FIG. 3 shows a plan view of an original cover closer as shown in FIG. 2 without a multifunction printer and an original cover, both shown in imaginary lines in FIG. 2.
Figure 9:
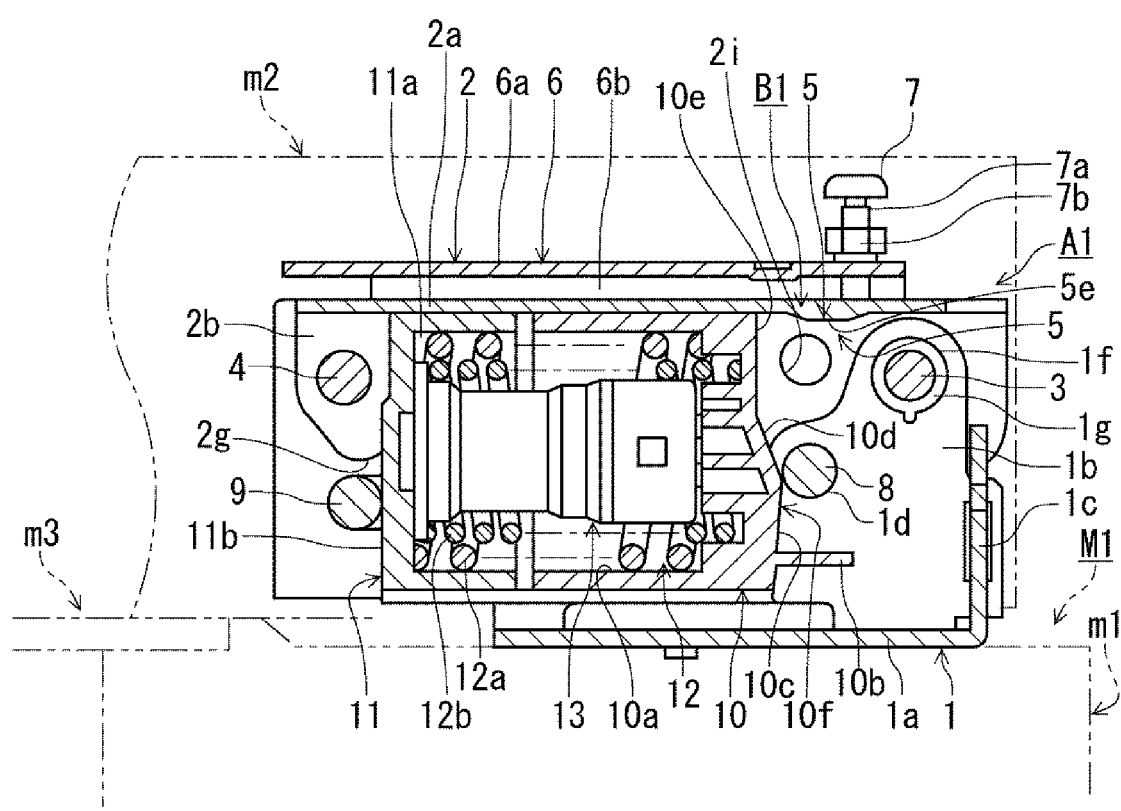
FIG. 9 shows a cross sectional view in line A-A of an original cover closer as shown in FIG. 3.

Next, reference is made to an operation of the original cover closer A1 according to Embodiment 1 as described above. Now, when the original cover m2 shown in imaginary lines is closed as shown in FIGS. 2 and 9, mainly due to the weight of the original cover m2, the original cover m2 is closed against the elastic force of an elastic means 12, and maintains a stable closing state. In the meantime, it is also possible here that the pressure receiving member 8 abuts against the downward inclined portion 10d while the original cover m2 is closed, so as to rotatably urge the original cover m2 in the closing direction. In any case, the side portion in the axial direction of the pressure receiving member 8 abuts against the cam portion 10f of the cam slider 10, and the pressurizing force is applied on the elastic means 12 as compressed. Next, when the original cover m2 is opened from the state as shown in FIGS. 2 and 9, the abutting position of the cam portion 10f of the cam slider 10 as it abuts against the pressure receiving member 8 moves from the upper area to the lower area of the upward inclined portion 10c of the cam portion 10f while maintaining its press contact, so, due to the elastic force of an elastic means 12, the original cover m2 is opened with its own weight being reduced. Once the user releases his hands from the original cover m2 opened, it encounters the friction resistance with which the abutting position against the pressure receiving member 8 moves upwards on the upward inclined portion 10c of the cam slider 10 urged to slide in one direction by the elastic means 12. In this manner, the rotation moment generated by the original cover m2 via the supporting member 2 around the hinge shaft 3 is equivalent to the rotation torque generated by the elastic force of the elastic means 12 and the pressure receiving member 8 abutting against the cam portion 10f of the cam slider 10. In this embodiment, the original cover m2 can stably stop and maintain the position at opening angles of the original cover m2 more than 20 degrees. When the original cover m2 is opened 20 degrees from its closing state as shown in FIG. 2, the upper rear end portion of the sliding cam slider starts to abut against the inclined portions 5c, 5c of the friction protruding ridge portions 5, 5 of the first brake means B1, so that the brake action takes place. Here, since the gently-sloping inclined portions 5c, 5c gently climbing toward the flat portions 5e, 5e are formed on the cam slider 10 side of the friction protruding ridge portions 5, 5, the cam slider 10 is smoothly brought into contact with the friction protruding ridge portions 5, 5, without giving a sudden and great impact, which thus ensures an enhanced operability. This brake action keeps on having effect up to the opening angle of 60 degrees of the original cover m2; this embodiment is structured such that, from 60 degrees on, though not shown, the cam slider 10 is released from the pressure receiving member 8 and the stopper portion 10e side of the cam slider 10 abuts against the hinge shaft 3 so as to block the slide movement.

To close the original cover m2 once opened, though it encounters the resistance as the pressure receiving member 8 slides toward the upper area of the cam portion 10f of the cam slider 10 against the elastic force of the elastic means 12, the original cover m2 can be closed due to the weight of the original cover m2 and the inertia force; at the predetermined closing angle, e.g. 10 degrees, the moment of the original cover m2 in the closing direction starts to prevail so that the original cover can be automatically closed even if the hands of the user are off the original cover, but in the original cover closer according to the invention the damper means functions to provide the buffer action, which eliminates the fear for sudden closing and the big noise of the original cover m2 or for pinching the fingers of the user.

The grease is applied on the respective slide surfaces of the pressure receiving member 8 and the cam portion 10f of the cam slider 10. The plurality of grease traps 10g is provided on such slide surface, on the upward inclined portion 10c side of the cam slider 10. There is no limitation to shape, installing location and number of the grease traps 10g.

Figure 12:
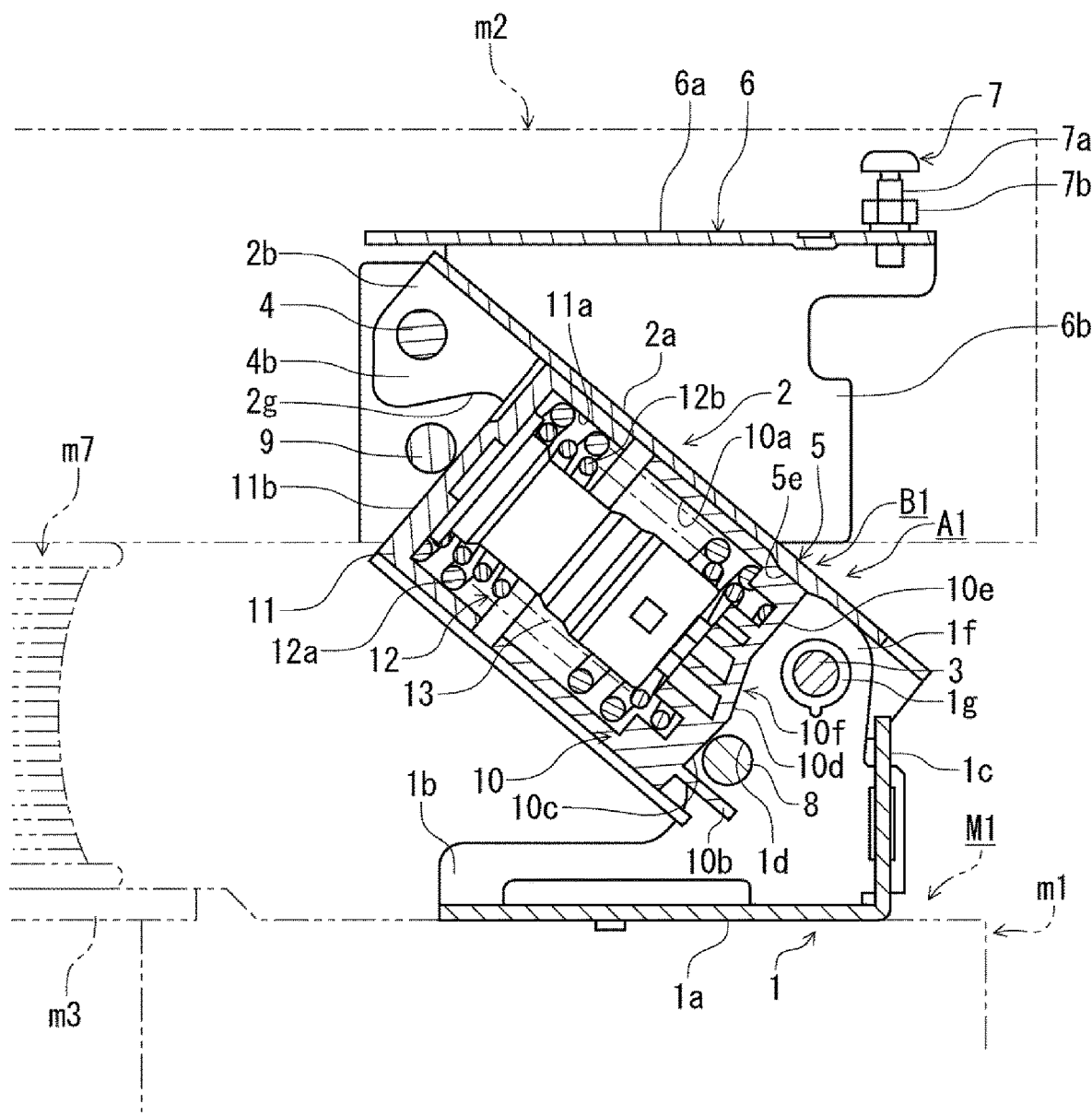
FIG. 12 shows an explanatory view illustrating an operation of an original cover closer as shown in FIG. 9, which is used together with a thick original such as book.
Figure 13:
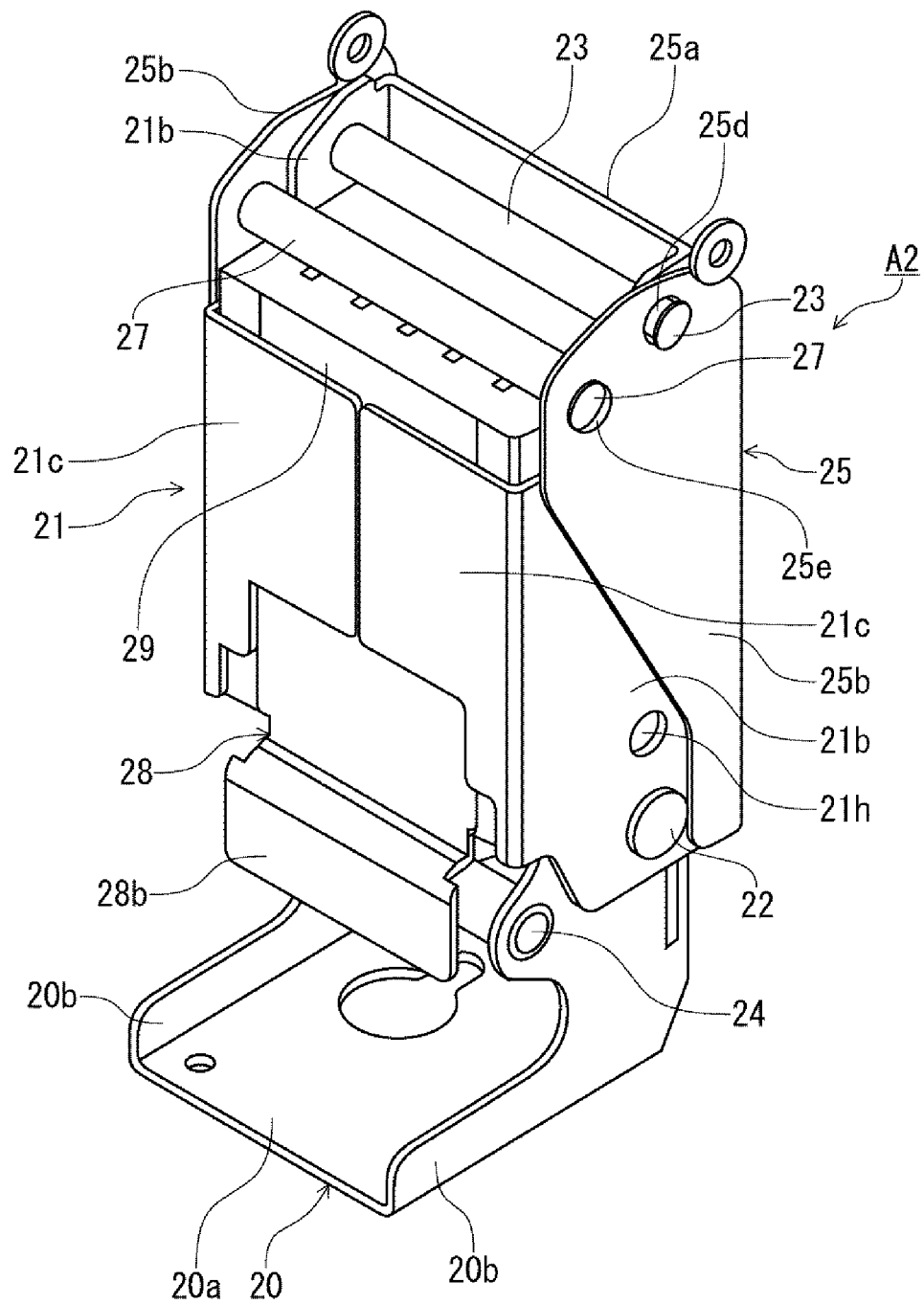
FIG. 13 shows a perspective view of appearance of Embodiment 2 of an original cover closer according to the invention.
Figure 14:
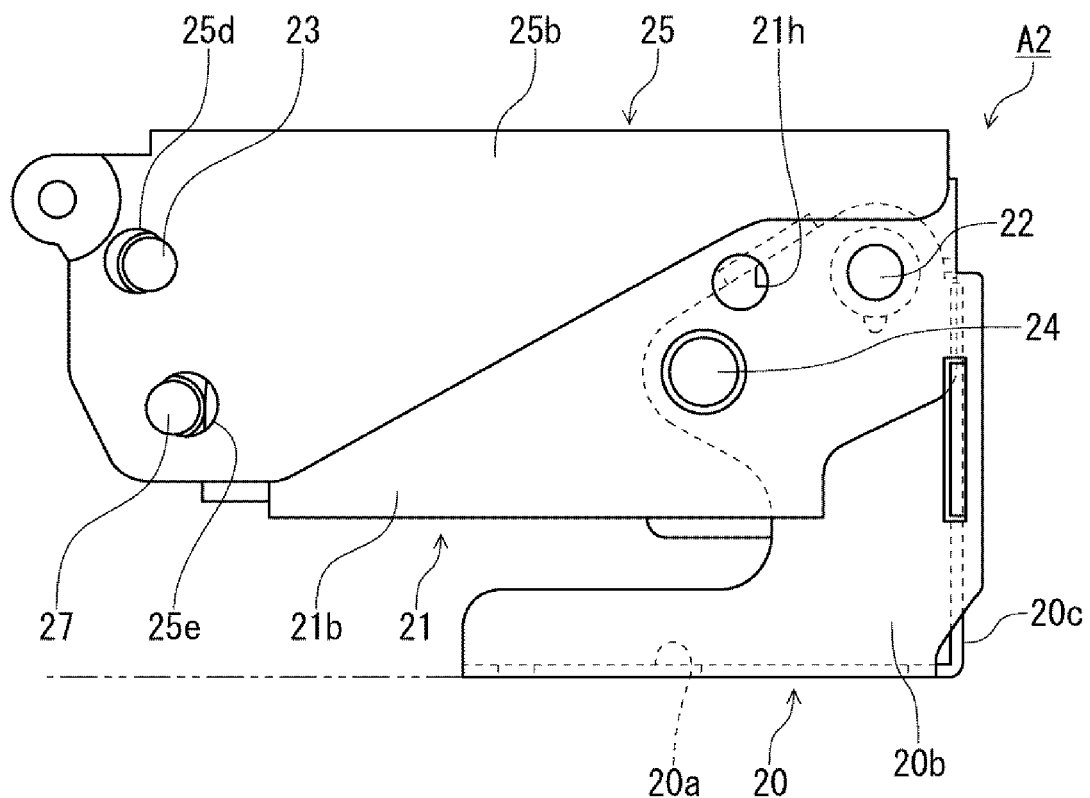
FIG. 14 shows a side view of an original cover closer as shown in FIG. 13 which is attached to a main body of an office equipment shown in imaginary lines, with an original cover shown in imaginary lines as well being closed.
Figure 15:
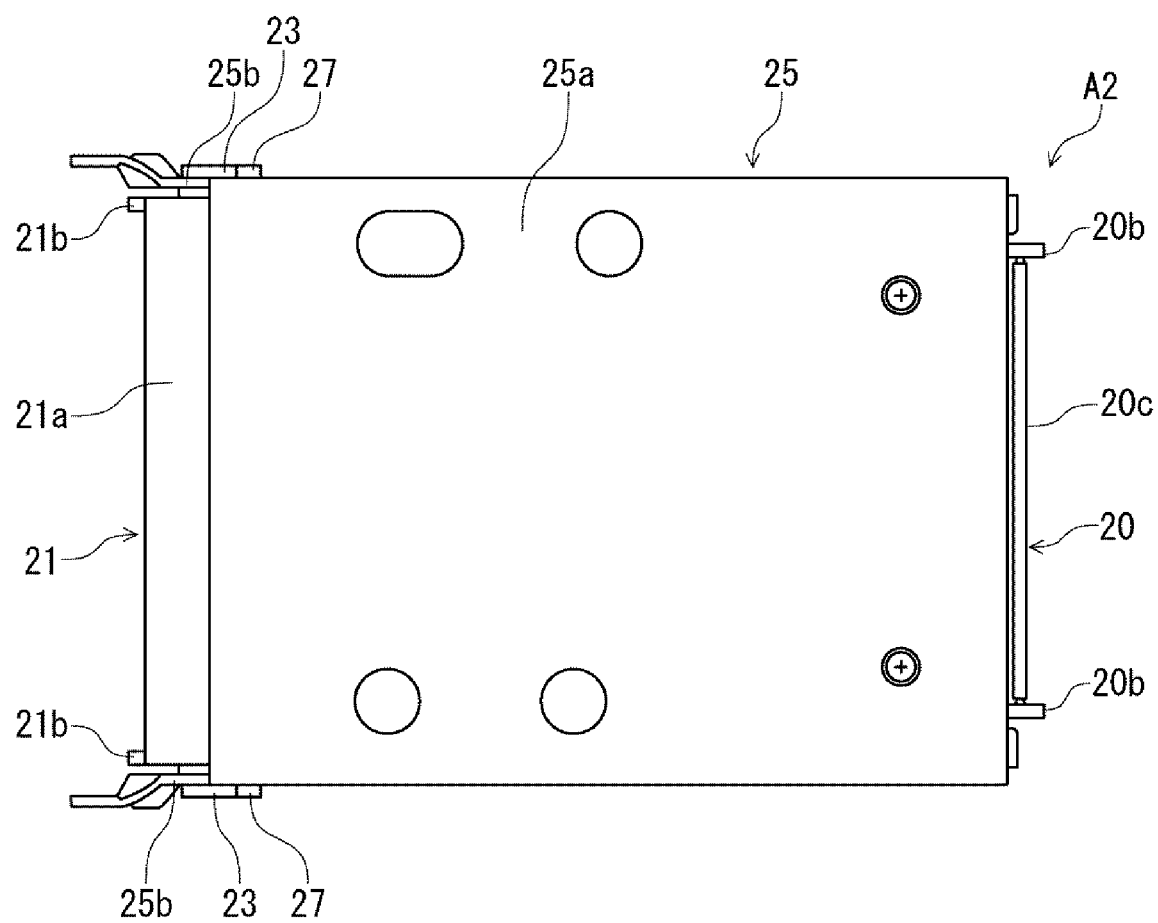
FIG. 15 shows a plan view of an original cover closer as shown in FIG. 14 without a multifunction printer and an original cover, both shown in imaginary lines in FIG. 14.
Figure 16:
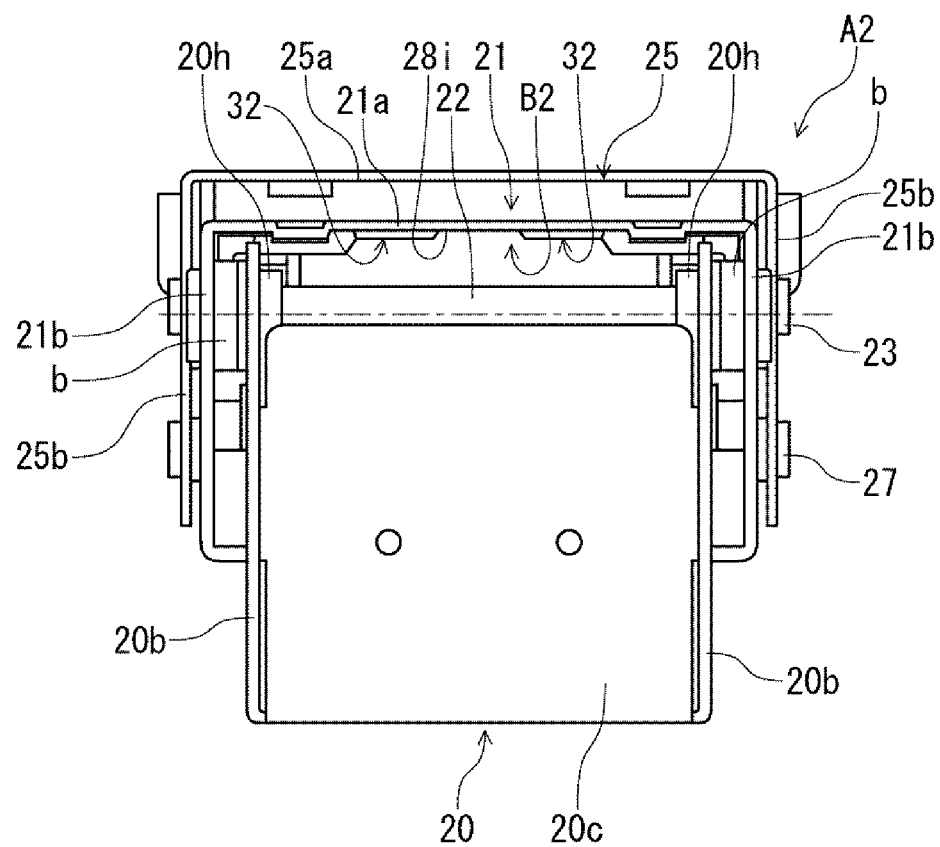
FIG. 16 shows a back view of an original cover closer as shown in FIG. 14 without a multifunction printer and an original cover, both shown in imaginary lines in FIG. 14.

As per the case with the original being the thick original m7 such as a book, if the original cover m2 is pressed downward with this thick original m7 being set on the contact glass m3 (platen glass), shown in FIG. 12, the spring bearing member 11 is pressed by the actuating member 9 attached to the both side plates 6b, 6b of the lift member 6 rotating about the lift shaft 4 as a fulcrum, to slide toward the cam slider 10 against the elastic force of the elastic means 12, and the original cover m2 rotates about the lift shaft 4 being an axis, in order to horizontally cover the upper surface of the thick original m7. Accordingly, the original cover closer A1 according to this embodiment can stably bring the original, regardless of its thickness, into press contact with the upper surface of the main body m1, and especially in case of the thick original m7, prevent external light from entering into the exposed components inside the main body through the contact glass m3 as far as possible.

Embodiment 2

FIGS. 13 to 23 show Embodiment 2 of an original cover closer according to the invention. An original cover closer A2 according to Embodiment 2 is larger than an original cover closer A1 according to Embodiment 1, but both have substantially identical structure. To this end, an attaching member 20, a supporting member 21, a hinge shaft 22, a lift shaft 23, a pressure receiving member 24, a lift member 25, an actuating member 27, a cam slider 28 and a spring bearing member 29 here have larger dimensions, and above all widths, than those in Embodiment 1. This is mainly because an original cover closer A2 according to Embodiment 2 herein opens and closes a heavier original cover m5 than the one applicable to an original cover closer A1 according to Embodiment 1.

More specifically, particularly as shown in FIGS. 17 and 21 to 23, the attaching member 20 comprises an attaching plate 20a attached onto a main body m4 of a multifunction printer M2, both side plates 20b, 20b provided on both sides of the attaching plate 20a upward and perpendicular (also substantially perpendicular) to the attaching plate 20a, and a rear plate 20c provided on a rear end portion of the attaching plate 20a upward and perpendicular (also substantially perpendicular) to the attaching plate 20a and locking its both sides to the both side plates 20b, 20b of the attaching member 20.

Particularly as shown in FIG. 18, a supporting member 21 comprises a back plate 21a, both side plates 21b, 21b hanging down from both ends of the back plate 21a, embracing pieces 21c, 21c respectively bent inward from respective lower ends of the both side plates 21b, 21b; each of the both side plates 21b, 21b is provided with a circular attaching hole 21d and a deformed attaching hole 21e on its one end, and with attaching holes 21g, 21g (only one is shown) for a lift shaft 23 on its other end. Moreover, the supporting member 21 is provided with guide groove portions 21f, 21f on its both side plates 21b, 21b, which are respectively located below the attaching holes 21g, 21g (only one is shown) and into which both ends of an actuating member 27 penetrate. Still further, insertion holes 21h, 21h respectively provided in vicinity of a circular attaching hole 21d and a deformed attaching hole 21e are intended to hold a cam slider 28 with pins being inserted therein, when the supporting member 21 is coupled to the attaching member 20 via a hinge shaft 22; reference numerals 21i, 21i denote convex portions.

A hinge shaft 22 which is made of metal and a round bar in the shape of pin comprises a deformed shaft portion (not shown); it is inserted through shaft bearing members 20h, 20h attached to shaft bearing member attaching holes 20g, 20g of the attaching member 20, then it is fixed to the supporting member 21 by caulking its both end portions, and attached to the attaching member 20 together with the supporting member 21, such that the supporting member 21 is rotatable relative to the attaching member 20. Ring-shaped spacers b, b are provided between the outside of the both side plates 20b, 20b of the attaching member 20 and the both side plates 21b, 21b of the supporting member 21, and the hinge shaft 22 is also inserted through the spacers. Here, while in the conventional original cover closer, a flange portion is provided on one end portion of a hinge shaft, and friction washers or spring washers are interposed between a side plate of an attaching member and a side plate of a supporting member on the side with the flange portion, and then the other end portion of the hinge shaft is caulked so as to generate a friction torque, according to the invention, a first brake means B2 for generating a friction torque is separately provided, so that a flange portion of a hinge shaft 22, and friction washers or spring washers can be omitted, and it is possible to reduce manufacturing costs.

This hinge shaft 22 according to Embodiment 2 can be also divided into two, as is stated in Embodiment 1. The hinge shaft 22 also includes the one divided into two, and this feature applies, not only to the hinge shaft 22 according to Embodiment 2, but also to a hinge shaft 38 according to Embodiment 3.

A lift member 25 comprises a back plate 25a and both side plates 25b, 25b hanging down from both ends of the back plate 25a, perpendicular (also substantially perpendicular) to the back plate 25a. A lift shaft 23 inserted through coupling holes 25d, 25d on a free end side of both side plates 21b, 21b of a supporting member 21 is inserted through attaching holes 25d, 25d provided on the both side plates 25b, 25b of the lift member 25; in this manner, the latter is coupled to the outside of the supporting member 21, so as to be rotatable in a direction contrary to the rotation direction of the supporting member 21. Moreover, attaching holes 25e, 25e having a common shaft center are provided on the side of the lift member 25 coupled via the lift shaft 23, and an actuating member 27 made of metal in the shape of pin is attached to the attaching holes 25e, 25e.

In the meantime, an actuating member 27 can be integrally or separately provided from a top plate provided on a tip side of the lift member 25. Still further, as shown in FIG. 24 of Embodiment 3 to be described below, the invention is also applicable to an original cover closer A3 with no lift member. Claim 1 of the invention relates to this case.

In the meantime, as is the case in Embodiment 1, no height adjusting means 7 is provided on a back plate 25a of a lift member 25 in Embodiment 2 as well, it is also an option to provide such.

Though not shown, respective small diameter portions are provided on both end portions of a lift shaft 23 on one hand, and on those of an actuating member 27 on the other. The ones on a supporting member 21 of coupling holes 21g, 21g (only one is shown) provided on the supporting member 25 and deformed holes 25d, 25d (only one is shown); 25e, 25e (only one is shown) provided on a lift member 25, wherein the lift shaft 23 is inserted through all of the coupling holes and the deformed holes, have the shape of round cylinder with a diameter adjusted to an outer diameter of a large diameter portion of a lift shaft 23, while the deformed holes 25d, 25d (only one is shown) and the deformed holes 25e, 25e on the lift member 25 have a keyhole shape consisting of a large and small circular holes with two centers, the latter on the top of the other; and the small circular hole is engaged with a small diameter portion of the lift shaft 23, which is then caulked. In the meantime, in the deformed holes 25d, 25d to which the lift shaft 23 is attached and the deformed holes 25e, 25e to which the actuating member 27 is attached, respective small circular holes lies in opposite direction, and the small circular holes of the deformed holes 25d, 25d face slightly downward. This is because due to a resilient force of an elastic means 30 working on the actuating member 27, a pressurizing force is applied on the side with the small circular hole. The right and the left ones of the deformed holes 25e, 25e to be coupled to an actuating member 27 have a different shape, and small diameter portions of the actuating member 27 is inserted through an areas being deformed holes to engage therewith, then its both end portions are caulked. In both cases, E-ring and so on are omitted in order to facilitate an attachment of the lift shaft and a coupling member and to reduce the cost.

A cam slider 28 embraced by embracing pieces 21c, 21c is slidably housed into the supporting member 21, and a spring bearing member 29 is also housed therein and fixed thereto.

Spring bearing hole portions 28a, 28a are provided on one end portion of the cam slider 28 toward the spring bearing member 29, a cover portion 28b and a cam portion 28f consisting of an upward inclined portion 28c and a downward inclined portion 28d provided next to the upward inclined portion 28c are respectively provided, as well as a stopper concave portion 28e next to the downward inclined portion 28d. And then, a pair of strip-shaped projecting ridge portions 28g, 28g is provided from front to rear on both side portions of the side in contact with embracing pieces 21c, 21c, and a central portion is a concave portion 28j. Still further, a central shelf-shaped portion 28i is provided on an upper surface portion of a cam slider 28. With such an arrangement, the cam slider 28 is designed to have a less surface in contact with the inside respectively of embracing pieces 21c, 21c and a back plate 21a, in order to mitigate a friction resistance of a cam slider 28 sliding inside the supporting member 21. Still further, the cam slider 28 is structured such that it has a height and a width 0.1 mm smaller than respective dimensions inside a supporting member 21, as in Embodiment 1.

A spring bearing member 29 is formed in the shape of bottomed cylindrical body having a rectangular cross section, and spring bearing hole portions 29a, 29a are provided on the cam slider 28 side. A cam slider 28 and the spring bearing member 29 are housed in the supporting member 21, such that the spring bearing hole portions 28a, 28a on one hand and the spring bearing hole portions 29a, 29a on the other face each other, and the cam portion 28f of the cam slider 28 abuts against the pressure receiving member 24, while an abutting portion 29b of the spring bearing member 28 abuts against the actuating member 27.

An elastic means 30 according to Embodiment 2 uses twin coil springs 30a, 30b both of the same diameter in difference to Embodiment 1; a damper means 13 is housed into one coil spring 30a, and the elastic means as a whole is provided between the cam slider 28 and the spring bearing member 29.

In the meantime, an actuating member 27 is made of metal in the shape of pin in the Embodiment, but it is also possible that a top plate is provided on the lift member 25 and bent inwardly, or that an actuating member consisting of a separate member is provided on the top plate. Still further, an actuating member 27 can be rotatably or fixedly attached between both side plates 25b, 25b of the lift member 25.

Next, a first brake means B2 is composed of a pair of friction protruding ridge portions 32, 32 provided substantially in parallel with a predetermined interval on a rear portion side of a back plate 21a of a supporting member 21, and intended to be in press contact with a back portion of a cam slider 28 within a predetermined range of opening and closing angles of an original cover m5, in order to exhibit a brake action to the supporting member 21 rotating about a hinge shaft 22 as a fulcrum. Each of the friction protruding ridge portions 32, 32 is formed to have inclined portions 32c, 32c; 32d, 32d gently climbing toward its central portion, which are respectively provided on its starting end portion 5a, 5a and terminal portion 32b, 32b, while its central portion is formed as a flat portion 32e, 32e. The height of each of the friction protruding ridge portions 32, 32 is approximately 0.35 mm in the area of the flat portions 32e, 32e. As per the shape of each of the starting end portions 32a, 32a and each of the terminal portions 32b, 32b, these portions are in parallel to the edge on the rear end portion side, i.e. perpendicular to both side plates 21b, 21b of a supporting member 21. The starting end portions 32a, 32a and the terminal portions 32b, 32b can be also respectively formed in a semicircular or cuspidal shape. As other embodiments, it is not necessarily excluded to use only one but wider friction protruding ridge portion and not two narrow friction protruding ridge portions 32, 32 or more than two friction protruding ridge portions, but the friction protruding ridge portions according to the present embodiment is the most suitable.

In this embodiment, a cam slider 28 in particular is formed to be approximately 0.1 mm smaller than the dimension between an inner wall side of a back plate 21a on one hand and embracing pieces 21c, 21c of a supporting member 21 on the other, as well as that inside the both side plates 21b, 21b of the supporting member 21. This arrangement is so made to take into consideration the thickness of the friction protruding ridge portions 32, 32 of a first brake means B2.

Furthermore, friction protruding ridge portions 32, 32 of the first brake means B2 can be also provided on the side of both side plates 21b, 21b of a supporting member 21. Still further, since a cam slider 28 is made of synthetic resin, it can be also structured to generate the whole or a part of friction torque by its deformation.

In the meantime, a pressure receiving member 24 is made of metal in the shape of pin, and its one end portion is formed as a small diameter portion, and this small diameter portion is inserted through a large and small attaching holes 20e, 20f provided on both side plates 20b, 20b of an attaching member 20, and then its both end portions are caulked, so that it is fixed to the both side plates 20b, 20b of the attaching member 20; however, it is also possible to restrict the escape using E-ring. Furthermore, it can be also rotatably attached to the both side plates 20b, 20b. Still further, the pressure receiving member 24 can have other shape than the shape of pin: it is also possible to fix a bent member made of plate metal or synthetic resin and formed to have a protruding cross section to the inside of the both side plates 20b, 20b of an attaching member 20. Still further, it is also an option to fix or rotatably attach a cylindrical body made of synthetic resin or other material to the pressure receiving member 24

Figure 17:
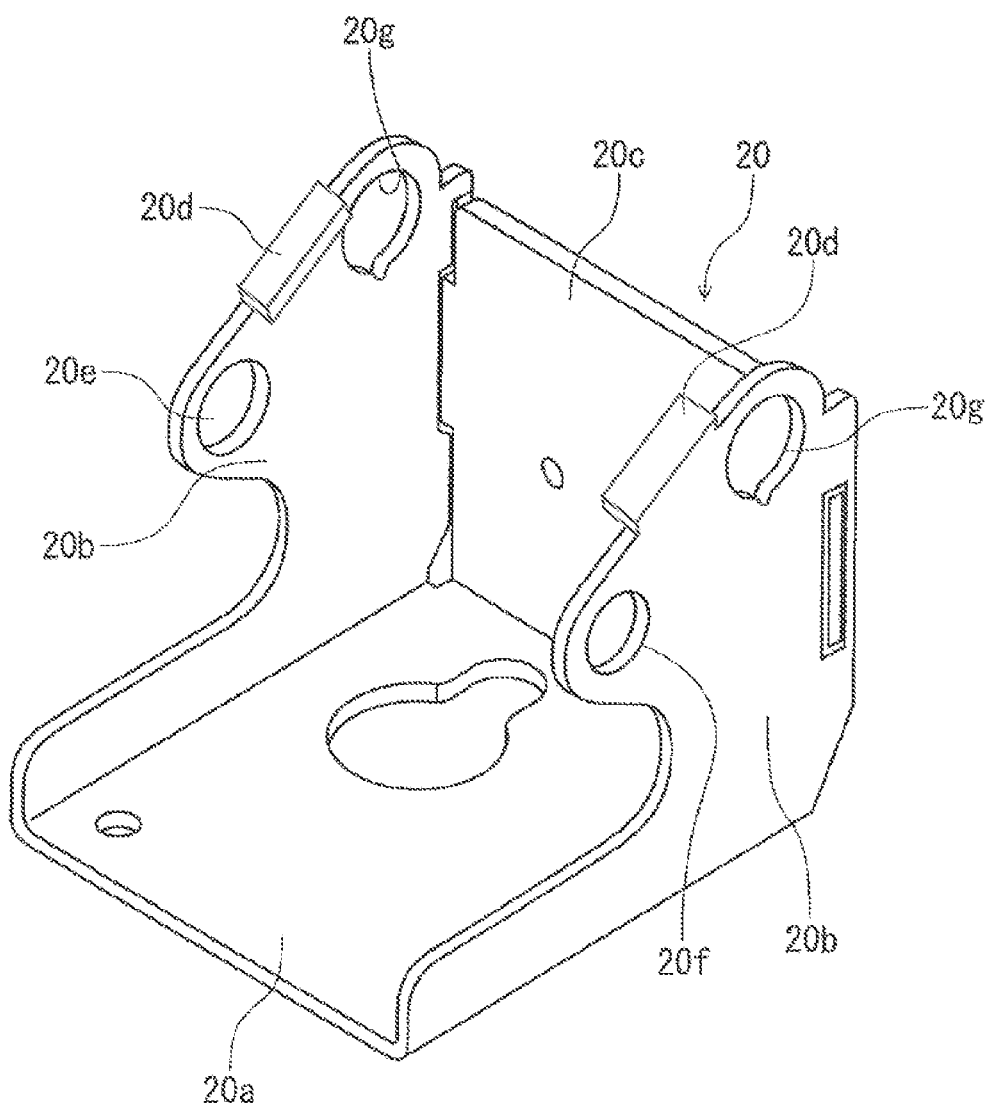
FIG. 17 shows a perspective view of an attaching member of an original cover closer as shown in FIGS. 13 to 16.
Figure 19A:
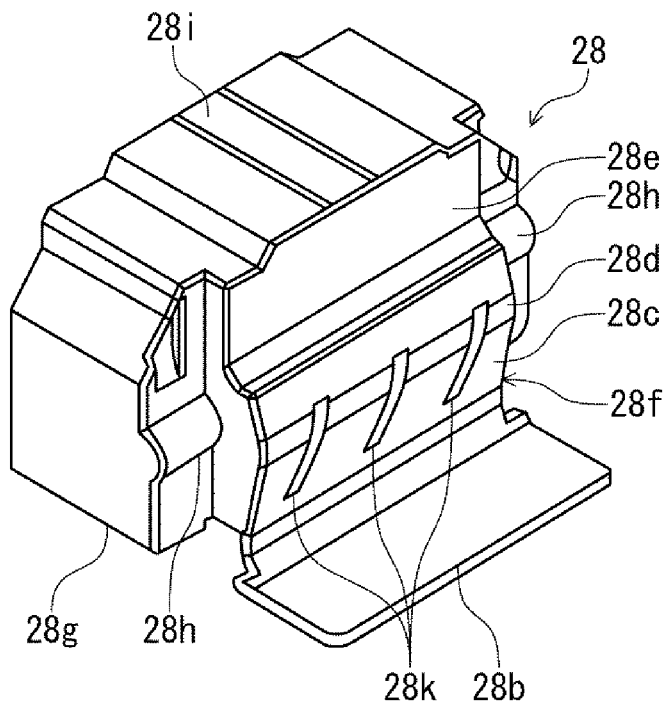
FIGS. 19A and 19B show a cam slider of an original cover closer as shown in FIGS. 13 to 16, FIG. 19A being its perspective view as seen from the top, and FIG. 19B—its elevation view.
Figure 19B:
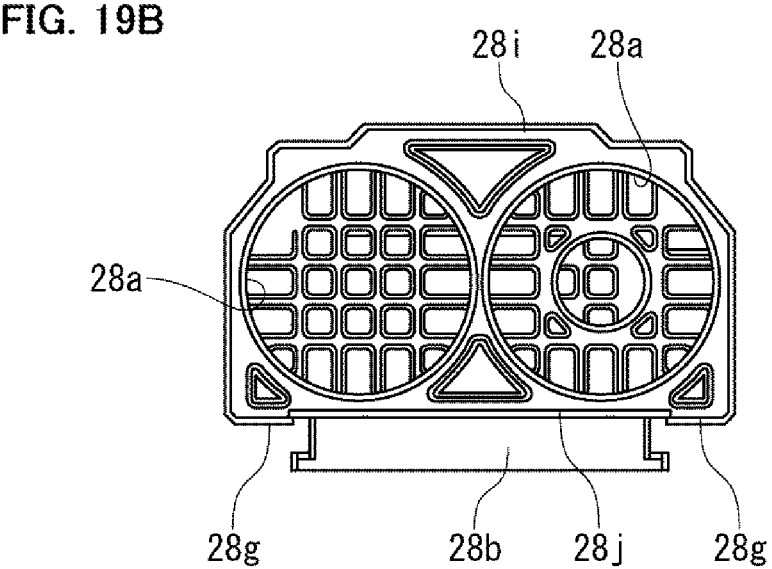
Figure 20A:
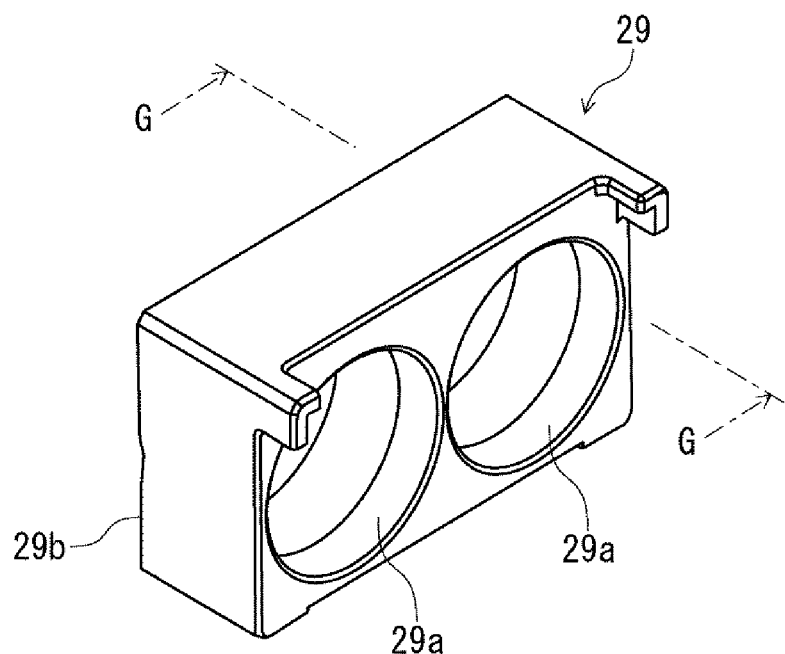
FIGS. 20A and 20B show a spring bearing member of an original cover closer as shown in FIG. 13, FIG. 20A being its perspective view as seen from backward, and FIG. 20B—its cross sectional view in line G-G in FIG. 20A.
Figure 20B:
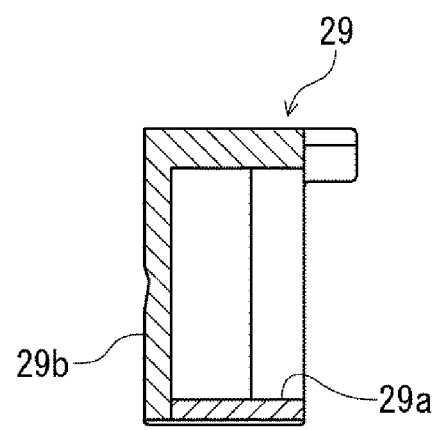

Still further, a second brake means 33 for a supporting member 21 is provided on an original cover closer A2 according to Embodiment 2 as described above. Especially as shown in FIG. 17, the second brake means 33 comprises braking pieces 20d, 20d provided on respective upper portions of both side plates 20b, 20b of an attaching member 20, and projection portions 28h, 28h (especially as shown in FIG. 19) provided on both side portions of a cam slider 28 abutting against the braking pieces 20d, 20d depending on an opening and closing angle of an original cover m5.

Figure 21:
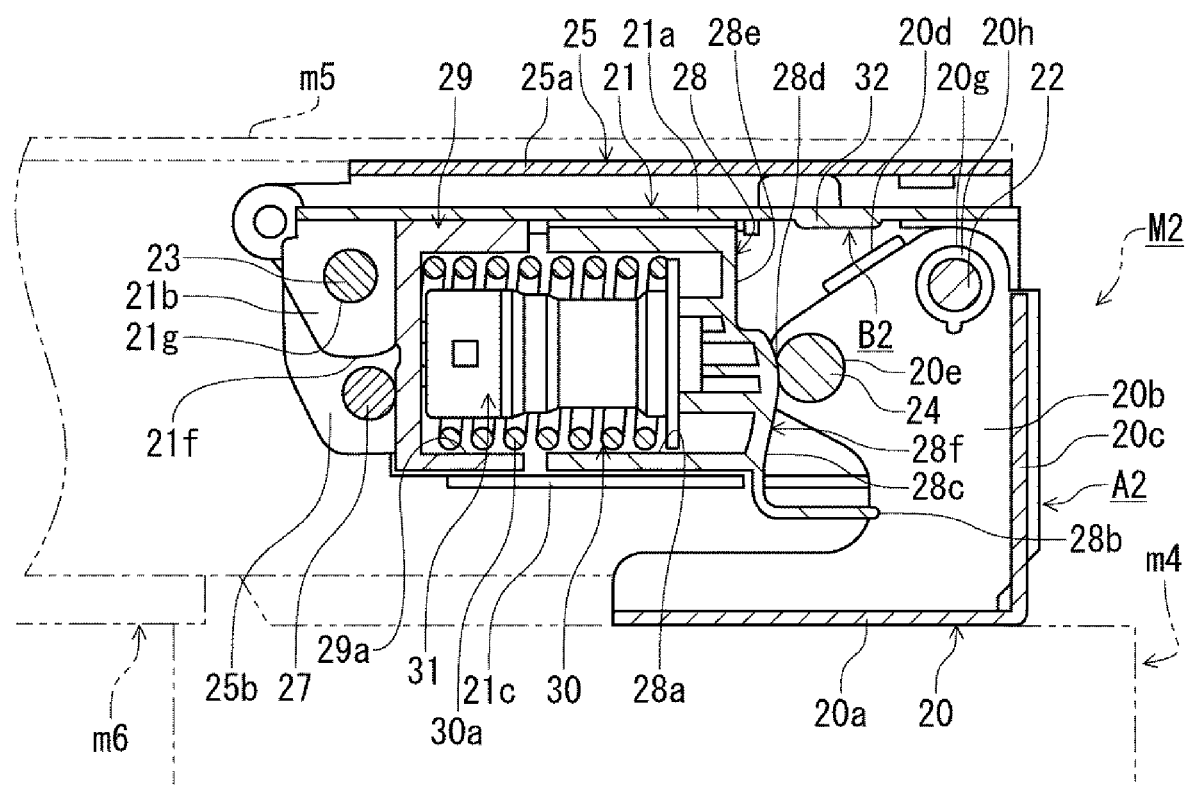
FIG. 21 shows a longitudinal cross sectional view of an original cover closer as shown in FIG. 14.
Figure 22:
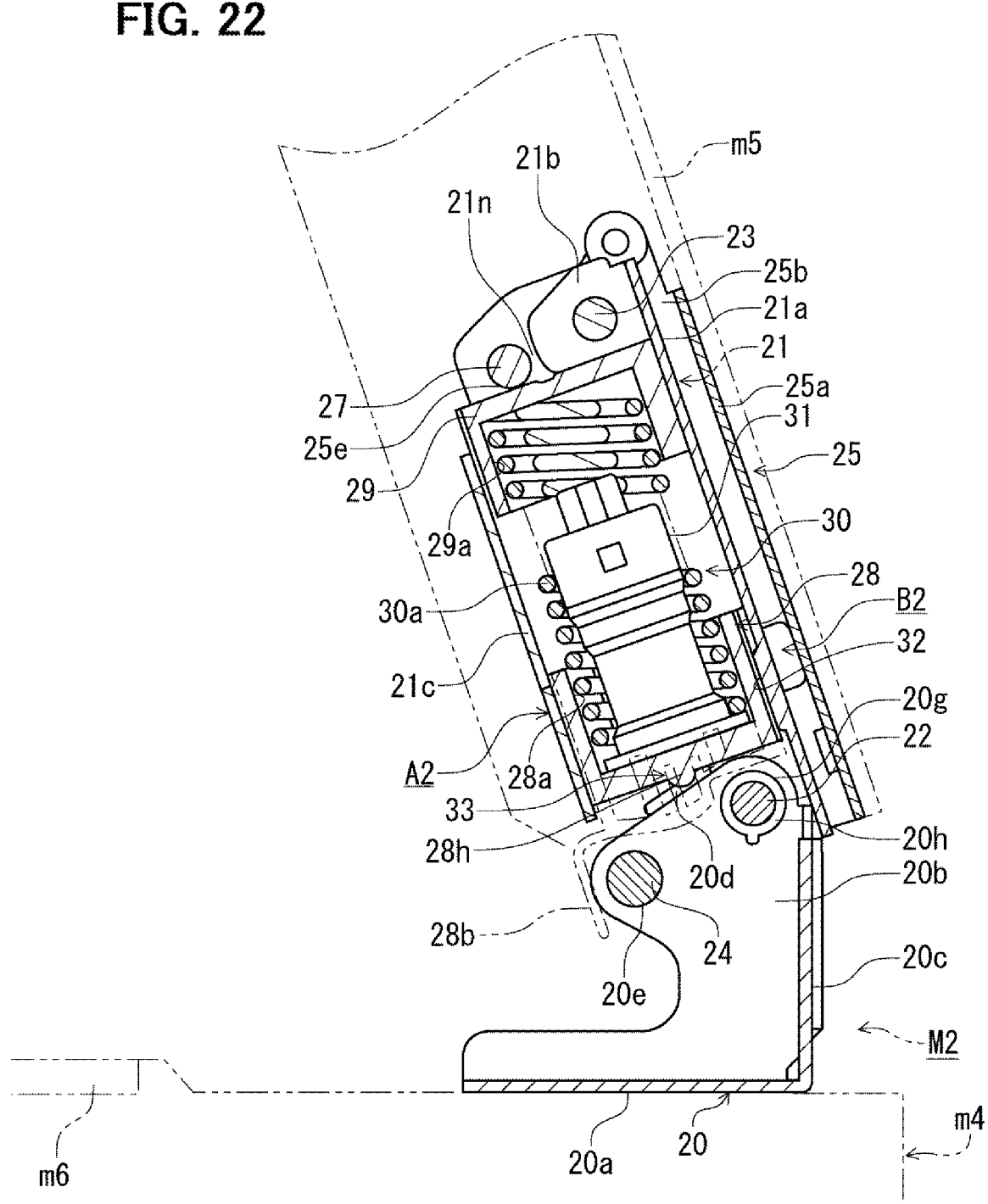
FIG. 22 shows an explanatory view illustrating an operation of friction stopper means of an original cover closer as shown in FIG. 21, which is opened 70 degrees.

Next, reference is made to an operation of the original cover closer A2 according to Embodiment 2 as described above. Now, when the original cover m5 shown in imaginary lines is closed especially as shown in FIG. 21, mainly due to the weight of the original cover m5, the original cover m5 is closed against the elastic force of the elastic means 30, and maintains a stable closed state. In the meantime, it is also possible here that the pressure receiving member 24 abuts against the downward inclined portion 28d of the cam slider 28 while the original cover m5 is closed, so as to rotatably urge the original cover m5 in the closing direction. In any case, the side portion in the axial direction of the pressure receiving member 24 abuts against the cam portion 28f of the cam slider 28, and the pressurizing force is applied on the elastic means 30 as compressed at the most.

Figure 10:
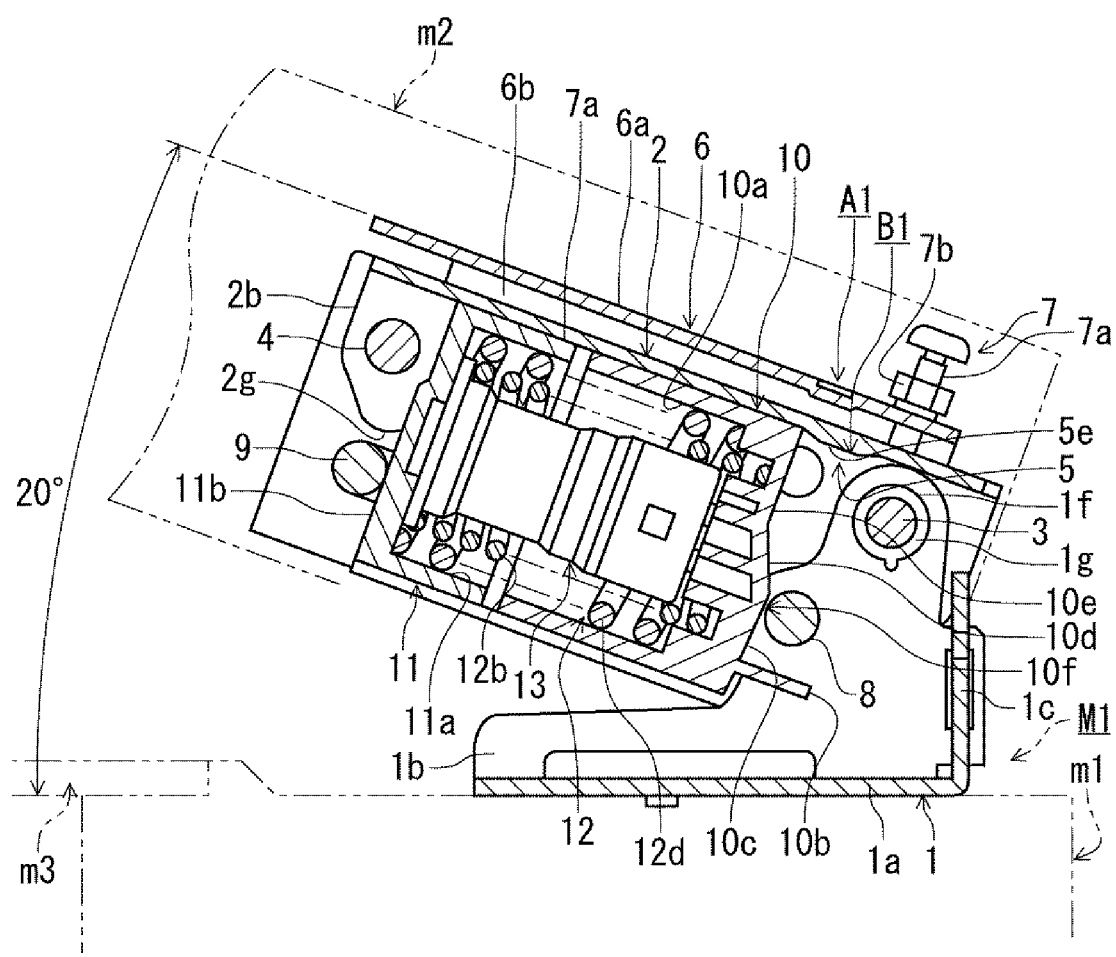
FIG. 10 shows a cross sectional view of an original cover closer as shown in FIG. 9, which is opened 20 degrees.
Figure 11:
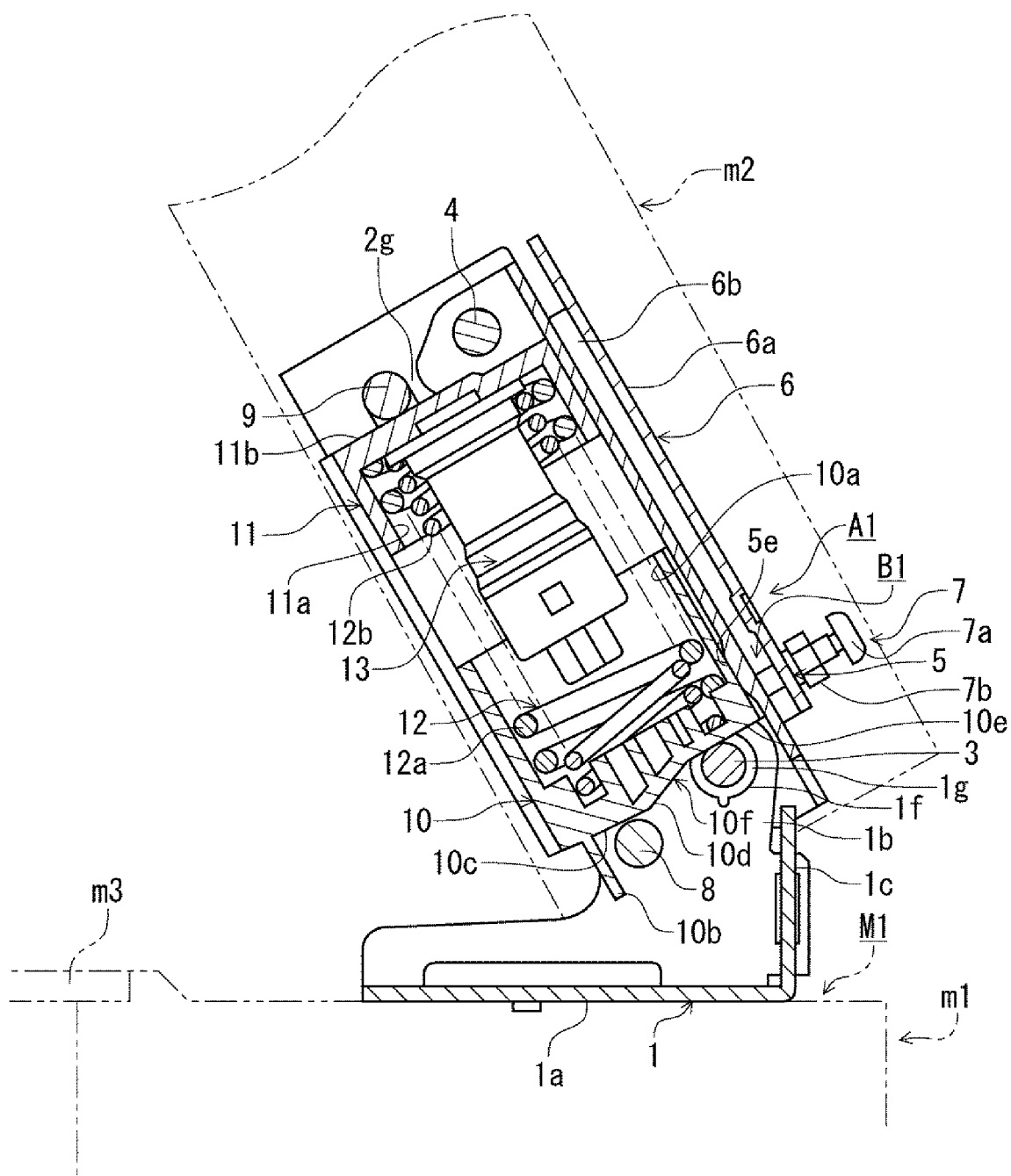
FIG. 11 shows a cross sectional view of an original cover closer as shown in FIG. 9, which is opened 60 degrees.

Next, when the original cover m5 is opened from the state as shown in FIG. 21, though detailed illustration is omitted, as FIG. 10 of Embodiment 1 also applies herein, the abutting position of the cam portion 28f of the cam slider 28 as it abuts against the pressure receiving member 24 moves from the upward inclined portion 28d to the upper area of the upward inclined portion 28c of the cam portion 28f, and further moving from there while maintaining its press contact, so that, due to the elastic force of the elastic means 30, the original cover m5 is opened with its own weight being reduced. Once the user releases his hands from the original cover m5 opened, it encounters the friction resistance with which the abutting position against the pressure receiving member 24 moves upwards on the upward inclined portion 28c of the cam slider 28 urged to slide in one direction by the elastic means 30. In this manner, the rotation moment generated by the original cover m5 via the supporting member 5 around the hinge shaft 22 is equivalent to the rotation torque generated by the elastic force of the elastic means 30 and the pressure receiving member 24 abutting against the upward inclined portion 28c of the cam slider 28. Therefore, the original cover is not automatically closed even if the hands are released from it. In this embodiment, the original cover m5 can stably stop and maintain the position at opening angles of the original cover m5 of 20 degrees or larger.

When the original cover m5 is opened 20 degrees from its closing state as shown in FIG. 21, the rear portion of the cam slider 28 sliding rides over and is brought into press contact with the friction protruding ridge portions 32, 32 of the brake means B2, so that the brake action takes place. Here, since the gently-sloping upward inclined portions 32c, 32c are formed on the cam slider 28 side of the friction protruding ridge portions 32, 32, the cam slider 28 is smoothly brought into contact with the friction protruding ridge portions 32, 32, without giving a sudden and great impact, which thus ensures an enhanced operability. This brake action keeps on having effect up to the opening angle of 60 degrees of the original cover m5; this embodiment is structured such that, from 60 degrees on, though not shown, the cam slider 28 is released from the pressure receiving member 24 and the second brake means 33 starts to function. The second brake means 33 starts to function due to the start of abutment of the projecting portions 28h, 28h of the cam slider 28 against the braking pieces 20d, 20d provided on the both side plate sides of an attaching member 20, keeps on functioning up to the maximum opening angle of 90 degrees of the original cover m5. It further prevents the original cover m5 from suddenly flipping up and suddenly falling from the maximum opening angle (90 degrees according to this embodiment).

Figure 23:
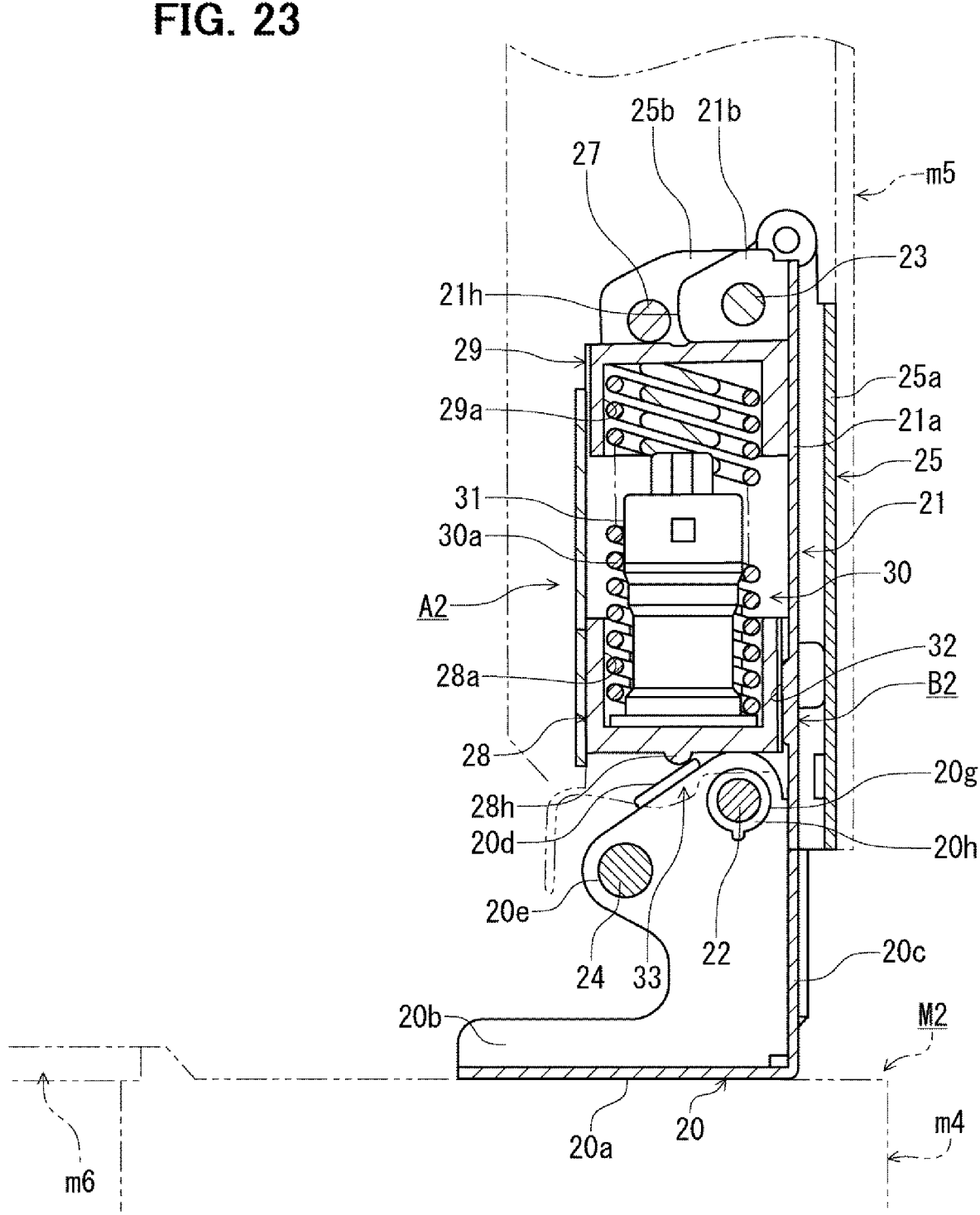
FIG. 23 shows an explanatory view illustrating an operation of friction stopper means of an original cover closer as shown in FIG. 21, which is opened 90 degrees.

Next, to close the original cover m5 once opened 90 degrees as shown in FIG. 23, it encounters the friction resistance of the second brake means 33; however, if the original cover m5 is further closed against this friction resistance, starting from about the closing angle of 60 degrees on, the pressure receiving member 24 abuts against the lower side of the upward inclined portion 28c of the cam slider 28, on which the elastic means 30 works. When the original cover m5 is further closed from this state, it encounters the resistance as the pressure receiving member 24 slides from the lower portion of the upward inclined portion 28c of the cam slider 28 to the upper area of the upward inclined portion 28c against the elastic force of the elastic means 30, but it is closed by a pressurizing operation on the original cover m5 by hands. When the original cover m5 is closed, and at the predetermined closing angle, e.g. 20 degrees, the moment of the original cover m5 in the closing direction starts to prevail so the original cover can be automatically closed even if the hands of the user are off the original cover, but the damper means 31 exhibits the buffer action, which eliminates the fear for sudden closing and the big noise of the original cover m5 or for pinching the fingers of the user.

Here, if the grease traps are provided on the sliding surfaces of the pressure receiving member 24 and the cam portion 28f of the cam slider 28, the holding ability of the grease is further enhanced. In this embodiment, the grease traps 28k, 28k . . . are provided on the upward inclined portion 28c and the downward inclined portion 28d of the cam portion 28f of the cam slider 28. There is no limitation to shape, installing location and number of the grease traps 28k, 28k.

In the meantime, the operation in case of a thick original such as a book is the same as in Embodiment 1, so the explanations are omitted.

In this manner, in the original cover closer m5 according to Embodiment 2, the damper means 31, the first brake means B2 and the second brake means 33 control the rotation of the supporting member 21 over the entire range of the opening and closing angles of the original cover m5, in order to make the opening and closing operation of the original cover m5 smooth. Such an arrangement is also applicable to Embodiment 1 and Embodiment 3 to be described below.

Embodiment 3

FIG. 24 shows a further Embodiment 3 of an original cover closer according to the invention. In an original cover closer A3 according to Embodiment 3, a lift member is omitted, and the invention is also applicable to the original cover closer A3 of such a structure. Claim 1 of the present invention relates to the original cover closer A3 of such a structure.

According to FIG. 24, an attaching member 35 is attached to a main body m8 of a multifunction printer M3, an original cover m9 is attached to a supporting member 37. The supporting member 37 comprises a back plate 37a and both side plates 37b, 37b, and a top plate 37c hangs down from the back plate 37a. The supporting member is thus structured to receive a spring bearing member 36 with the top plate 37c. In the meantime, the supporting member can be also structured to directly receive an end portion of an elastic means 41 with the top plate 37c, thus with no spring bearing member 36. Apart from that, a reference numeral m10 denotes a platen glass (contact glass), a reference numeral 38—a hinge shaft, a reference numeral 39—a pressure receiving member, and a reference numeral 40—a cam slider.

Since the structure of a brake means B3 of an original cover closer A3 according to Embodiment 3 is the same as that of Embodiment 1 or 2, its detailed illustration and description is omitted.

Furthermore, optional changes to design are allowable in that a damper means 13, 31 according to Embodiment 1 and 2 and/or a second brake means 33 according to Embodiment 2 are provided.

In the meantime, one or all of an attaching member, a supporting member and a lift member can be a synthetic resin mold.

The present invention is constructed as described above, therefore, it is suitably used as original cover closer comprising an elastic means of a simple structure and capable of controlling the opening and closing operation of the original cover closer, or office equipment using the original cover closer.

What is claimed is:

1. An original cover closer comprising:
an attaching member comprising an attaching plate, said attaching plate comprising two sides, attached to a main body side and side plates erected from both sides of said attaching plate;
a supporting member comprising at least a back plate, said back plate of said supporting member comprising two sides, and side plates hanging down from both sides of said back plate of said supporting member, said side plates of said supporting member being rotatably attached to said side plates of said attaching plate via a hinge shaft;
a lift member comprising at least a back plate, said back plate of said lift member comprising two sides, and side plates hanging down from both sides of said back plate of said lift member, said side plates of said lift member being rotatably attached to said side plates of said supporting member on a free end side thereof via a lift shaft, as well said original cover plate being attached thereto;
a pressure receiving member provided between said side plates of said attaching member;
a cam slider slidably provided inside said supporting member by making cam portion thereof abut against said pressure receiving member;
a spring bearing member slidably provided on a free end side inside said supporting member;
an actuating member abutting against said spring bearing member and attached between said side plates of said lift member;
an elastic means resiliently provided between said cam slider and said spring bearing member, so as to rotatably urge said lift member in a direction in which the latter overlaps said supporting member, and said supporting member in an opening direction of an original cover; and
a first brake means provided between said supporting member and said cam slider;
said first brake means consisting of a pair of friction protruding ridge portions provided on an inner wall surface of said supporting member toward said cam slider in parallel with a predetermined interval, and at least a gently-sloping inclined portion gradually climbing from said cam slider side being provided on each of said friction protruding ridge portions.

2. An original cover closer comprising:
an attaching member comprising an attaching plate, said attaching plate comprising two sides, attached to a main body side and side plates erected from both sides of the attaching plate;
a supporting member comprising at least a back plate, said back plate of said supporting member comprising two sides, and side plates hanging down from both sides of said back plate, of said supporting member said side plates being rotatably attached to said side plates of said attaching plate via a hinge shaft;
a lift member comprising at least a back plate, said back plate of said of said lift member comprising two sides, and side plates hanging down from both sides of said back plate of said lift member, said side plates of said lift member being rotatably attached to said side plates of said supporting member on a free end side thereof via a lift shaft, as well said original cover plate being attached thereto;
a pressure receiving member provided between said side plates of said attaching member;
a cam slider slidably provided inside said supporting member by making cam portion thereof abut against said pressure receiving member, said cam slide comprising two side portions;
a spring bearing member slidably provided on a free end side inside said supporting member;
an actuating member abutting against said spring bearing member and attached between said side plates of said lift member;
an elastic means resiliently provided between said cam slider and said spring bearing member, so as to rotatably urge said lift member in a direction in which the latter overlaps said supporting member, and said supporting member in an opening direction of an original cover;
a damper means functioning from a predetermined closing angle of said original cover;
a first brake means functioning within a range of a predetermined intermediate opening and closing angle; and
a second brake means functioning within a range of a predetermined intermediate opening and closing angle;
wherein said first brake means consists of a pair of friction protruding ridge portions provided on an inner wall surface of said supporting member toward said cam slider in parallel with a predetermined interval, and at least a gently-sloping inclined portion gradually climbing from said cam slider side being provided on each of said friction protruding ridge portions; and wherein said second brake means comprises braking pieces provided on respective upper portions of said side plates of said attaching member, and projection portions provided on said side portions of said cam slider abutting against said braking pieces depending on an opening and closing angle of said original cover.

3. The original cover closer according to claim 1, said hinge shaft being divided into two.

4. The original cover closer according to claim 1, said supporting member comprising embracing pieces covering said cam slider at least, and said cam slider comprising a protruding ridge portion on a side in contact with said embracing pieces.

5. The original cover closer according to claim 1, a cylinder body or rotation member being provided on an outer circumference of said pressure receiving member.

6. The original cover closer according to claim 1, said pressure receiving member having a pin shape and being attached between said side plates of said attaching member.

7. The original cover closer according to claim 1, said pressure receiving member being a bent member attached between said side plates of said attaching member.

8. The original cover closer according to claim 1, said cam slider being structured so as to be deformed in a pressurized contact with said friction protruding ridge portions to mitigate an impact at the time of accommodation of said friction protruding ridge portions.

9. The original cover closer according to claim 1, said brake means being provided so as to function between said supporting member and said cam slider within a range of an intermediate opening and closing angle of 20 to 60 degrees of said original cover.

10. The original cover closer according to claim 1, said brake means being provided inside each of said side plates of said supporting member.

11. The original cover closer according to claim 1, a damper means functioning from a predetermined closing angle of said original cover being provided between said cam slider and said spring bearing member.

12. The original cover closer according to claim 1, said friction stopper means being provided between said cam slider and said attaching member.

13. Office equipment using said original cover closer according to claim 1 between a main body and an original cover.

* * * * *